(12) United States Patent
Varadachari

(10) Patent No.: US 9,017,443 B2
(45) Date of Patent: Apr. 28, 2015

(54) PHOSPHATE FERTILIZERS AND METHODS OF USING THE SAME

(75) Inventor: Chandrika Varadachari, West Bengal (IN)

(73) Assignee: Agtec Innovations, Inc., Los Altos, CA (US)

( * ) Notice: Subject to any disclaimer, the term of this patent is extended or adjusted under 35 U.S.C. 154(b) by 16 days.

(21) Appl. No.: 13/816,072

(22) PCT Filed: Aug. 8, 2011

(86) PCT No.: PCT/IN2011/000520
§ 371 (c)(1),
(2), (4) Date: Feb. 11, 2013

(87) PCT Pub. No.: WO2012/020428
PCT Pub. Date: Feb. 16, 2012

(65) Prior Publication Data
US 2013/0133387 A1    May 30, 2013

Related U.S. Application Data

(60) Provisional application No. 61/390,583, filed on Oct. 6, 2010.

(30) Foreign Application Priority Data

Aug. 10, 2010   (IN) .............................. 885/KOL/2010

(51) Int. Cl.
C05B 17/00 (2006.01)
C05D 9/02 (2006.01)
C05B 13/06 (2006.01)

(52) U.S. Cl.
CPC ................. *C05B 17/00* (2013.01); *C05B 13/06* (2013.01)

(58) Field of Classification Search
CPC ........... C05B 17/00; C05B 13/06; C05D 9/02
USPC ................................. 71/11, 25–31, 46–64.13
See application file for complete search history.

(56) References Cited

U.S. PATENT DOCUMENTS

| | | | |
|---|---|---|---|
| 2,713,536 A | 1/1955 | Driskell | |
| 3,201,222 A | 8/1965 | Wilson | |
| 3,208,821 A | 9/1965 | Lehr et al. | |
| 3,244,500 A | 4/1966 | Stinson et al. | |
| 3,453,074 A | 7/1969 | Mustian et al. | |
| 3,533,737 A | 10/1970 | Farr et al. | |
| 3,574,591 A | 4/1971 | Lyons et al. | |
| 3,656,931 A | 4/1972 | Dancy | |
| 3,762,909 A | 10/1973 | Davie et al. | |
| 3,856,500 A | 12/1974 | Cox | |
| 3,956,464 A | 5/1976 | Dreschel et al. | |
| 4,163,820 A * | 8/1979 | Corver et al. | 428/212 |
| 4,321,078 A | 3/1982 | Michaud | |
| 4,512,793 A * | 4/1985 | Harrison | 71/29 |
| 4,585,751 A | 4/1986 | Kukes et al. | |
| 5,433,766 A | 7/1995 | Ming et al. | |
| 5,749,935 A | 5/1998 | Takahara et al. | |
| 6,322,607 B1 | 11/2001 | Brown et al. | |
| 6,575,155 B2 | 6/2003 | Brennan | |
| 7,497,891 B2 | 3/2009 | Peacock | |
| 7,670,405 B2 | 3/2010 | Varadachari | |
| 7,691,171 B2 | 4/2010 | Varadachari | |
| 7,850,758 B2 | 12/2010 | Birthisel | |
| 8,506,670 B2 | 8/2013 | Varadachari | |
| 2006/0260372 A1 | 11/2006 | Liu et al. | |
| 2007/0062232 A1 | 3/2007 | Urano et al. | |
| 2008/0236033 A1 | 10/2008 | Sun et al. | |
| 2010/0240533 A1 | 9/2010 | Varadachari | |
| 2013/0133387 A1* | 5/2013 | Varadachari | 71/48 |
| 2013/0143737 A1 | 6/2013 | Varadachari | |

FOREIGN PATENT DOCUMENTS

| | | |
|---|---|---|
| CN | 1467182 | 1/2004 |
| EP | 2393381 | 12/2011 |
| GB | 800417 A | 8/1958 |
| IN | 172800 A | 4/1993 |
| IN | 175597 A | 7/1995 |
| IN | 177205 A | 7/1996 |
| IN | 194747 A | 12/2010 |
| SU | 1270148 A | 11/1986 |
| WO | 81/00010 | 1/1981 |
| WO | 94/26660 | 11/1994 |
| WO | 2005/014505 A1 | 2/2005 |
| WO | 2005/014506 A2 | 2/2005 |
| WO | 2006/137084 A2 | 12/2006 |

(Continued)

OTHER PUBLICATIONS

Partha et al. "A new slow-releasing iron fertilizer" Chemical Engineering Journal 155 (2009) 451-456.*

Bandyopadhyay et al., A New Slow-Releasing Molybdenum Fertilizer, Journal of Agricultural & Food Chemistry, 2008, 56: 1343-1349.

Bhattacharya et al., Development of a Novel Slow-Releasing Iron-Manganese Fertilizer Compound, Ind. Eng. Chem. Res., 2007, 46: 2870-2876.

Chandra et al., A New Slow-Releasing Iron Fertilizer, Chemical Eng. Journal, 2009, 155: 451-456.

Mortvedt et al., Macronutrients in Agriculture, Soil Science Society of America, 1972, 356-365.

(Continued)

*Primary Examiner* — Jennifer A Smith
(74) *Attorney, Agent, or Firm* — Bryan Cave LLP

(57) ABSTRACT

A water-insoluble phosphate fertilizer, methods of producing, and methods of using the same are provided. The fertilizer may comprise at least one alkaline earth metal selected from calcium and magnesium and optionally at least one nutrient ion selected from the group consisting of potassium, ammonium, zinc, iron, manganese, copper, boron, chlorine, iodine, molybdenum or selenium. The fertilizer compounds are preferably water-insoluble, dilute acid-soluble, and free-flowing powders.

23 Claims, No Drawings

(56) References Cited

FOREIGN PATENT DOCUMENTS

| WO | 2007/095393 A2 | 8/2007 |
| WO | 2008/069676 A2 | 6/2008 |
| WO | 2008/083390 A2 | 7/2008 |
| WO | 2008/131535 A1 | 11/2008 |
| WO | 2010089766 | 8/2010 |
| WO | 2010089776 A1 | 8/2010 |
| WO | 2012/020428 A1 | 2/2012 |

OTHER PUBLICATIONS

Ray et al., Novel Slow-Releasing Micronutrient Fertilizers 2, Journal of Agriculture & Food Chemistry, 1997, 1447-1453.

Ray et al., Novel Slow-releasing micronutrient fertilizers. 1. Zinc compounds, Ind. Eng. Chem. Res., 1993, 32: 1218-1227.

Ray et al., Removing Micronutrient Metal Cation Interferences Prior to Titrimetric Determination of Polyphosphate Chain Length, Journal of Agriculture & Food Chemistry, 1998, 46: 2222-2226.

Roberts, G.J., FeO—K2O—P2O5 Glasses as a Source of Micronutrient Iron in Soil, Amer. Ceramic Society Bulletin, 1975, 54: 1069.

Roberts, G.J., Preparation and Properties of Glasses in the System FeO—K2O—P2O5, Amer. Ceramic Society Bulletin, 1973, 52: 383.

Varadachari et al., Bio-Release Multinutrient Fertilizers for High-Altitude Agriculture; Mountain Research & Development (Switzerland), 2009, 29(3): 241-249.

Varadachari, Phosphoric Acids, Phosphates and Fertilizers for the Future, Indian Nat. Sci. Academy Proceedings (Part B), 1992, 58: 119-126.

Varadachari, Novel Slow-Releasing Micronutrient Fertilizers, Fertilizer News, 1992, 37: 49-53.

Varadachari et al., Polyphosphates: The Future of Fertilizer Development, Everyman's Science, 1993, 28: 64-66.

Varadachari et al., Phosphoric Acid Polymerization and its Role in Fertilizer Development, Indian Fertilizer Scene Annual, 1992, 125-126.

International Search Report for PCT/IN2011/000519, dated Jan. 4, 2012, 4 pages.

International Search Report for PCT/IN2010/000062, dated Jun. 24, 2010, 6 pages.

Database WPI Week and SU 833927 A1, May 30, 1981 abstract, Thomson Scientific, London, Great Britain.

Volfkovich, S. I. Polymeric Fertilizers, J. Appl. Chem. (USSR) 1972, 45.2479-2487.

International Search Report for PCT/IN2011/000520, dated Dec. 28, 2011, 4 pages.

\* cited by examiner

PHOSPHATE FERTILIZERS AND METHODS OF USING THE SAME

FIELD OF THE INVENTION

The present invention generally relates to fertilizers and, in particular, to water-insoluble, slow-release phosphate fertilizers.

BACKGROUND OF THE INVENTION

Phosphates are macronutrients generally thought to be essential building blocks for plants and animals. Plant fertilization with phosphates, alone or in combination with nitrogen and potash fertilization, generally results in better crop yields and more nutritious food.

Prior phosphate fertilizers include diammonium phosphate (DAP), monoammonium phosphate (MAP), triple super phosphate (TSP) and others. These water-soluble compounds, however, tend to leach from the soil, leading some to apply an amount that is several times the actual crop uptake, leading to poor efficiency and the contamination of water bodies.

SUMMARY OF THE INVENTION

Among the various aspects of the present invention is the provision of phosphate fertilizers; the provision of water-insoluble phosphate fertilizers, the provision of dilute acid-soluble fertilizers, the provision of phosphate fertilizers optionally containing at least one nutrient ion selected from the group consisting of potassium, sodium, ammonium, boron, chromium, cobalt, copper, iodine, iron, manganese, molybdenum, selenium, sulfur and zinc. In a preferred embodiment, the phosphate fertilizers are in the form of free-flowing powders.

Briefly, therefore, the present invention is further directed to a water-insoluble, dilute acid-soluble inorganic polyphosphate composition in solid crystalline form, the inorganic polyphosphate composition containing 5 to 70 wt % orthophosphate and having a number average chain length of at least 2 phosphate units when the orthophosphate content of the polyphosphate polymer is excluded from the average chain length calculation.

The present invention is further directed to a water-insoluble, dilute acid-soluble inorganic polyphosphate composition in solid crystalline form, the inorganic polyphosphate composition containing 5 to 70 wt % orthophosphate and having a number average chain length of at least 1.2 phosphate units when the orthophosphate content of the polyphosphate polymer is included in the average chain length calculation.

The present invention is further directed to a water-insoluble, dilute acid-soluble inorganic polyphosphate composition in solid crystalline form, the inorganic polyphosphate composition containing calcium, magnesium or a combination thereof, 5 to 70 wt % orthophosphate, and optionally one or more micronutrient metals selected from the group consisting of chromium, cobalt, copper, iron, manganese, and zinc, with the proviso that the inorganic polyphosphate composition contains no more than 5 wt. % of the micronutrient metal(s), in combination, and no more than 3.5 wt % iron when iron is the only micronutrient. The inorganic polyphosphate polymer has a number average chain length of more than 2 but less than 50 repeat units when the orthophosphate content of the inorganic polyphosphate polymer is excluded from the average chain length calculation and a number average chain length of at least 1.1 but less than 50 repeat units when the orthophosphate content of the inorganic polyphosphate polymer is included in the average chain length calculation, the repeat units comprising phosphate, sulfate, borate, molybdate, or selenate units, or a combination thereof, provided the ratio of phosphate units to the combined total of sulfate, borate, molybdate and selenate repeat units comprised by the inorganic polyphosphate composition is at least 2:1. Iron may be considered to be the only micronutrient when the composition comprises no more than 0.01 wt. % of each of chromium, cobalt, copper, manganese, and zinc.

The present invention is further directed to a water-insoluble, dilute acid-soluble inorganic polyphosphate composition in solid crystalline form, the inorganic polyphosphate composition containing at least 15 wt. % calcium, magnesium or a combination thereof, 5 to 70 wt % orthophosphate, and optionally one or more micronutrient metals selected from the group consisting of chromium, cobalt, copper, iron, manganese, and zinc, with the proviso that the inorganic polyphosphate composition contains no more than 3.5 wt % iron when iron is the only micronutrient, no more than 7 wt. % manganese when manganese is the only micronutrient, and no more than 11 wt. % copper when copper is the only micronutrient. The inorganic polyphosphate polymer composition has a number average chain length of more than 2 but less than 50 repeat units when the orthophosphate content of the inorganic polyphosphate polymer composition is excluded from the average chain length calculation and a number average chain length of at least 1.1 but less than 50 repeat units when the orthophosphate content of the inorganic polyphosphate polymer composition is included in the average chain length calculation, the repeat units comprising phosphate, sulfate, borate, molybdate, or selenate units, or a combination thereof, provided the ratio of phosphate units to the combined total of sulfate, borate, molybdate and selenate repeat units comprised by the inorganic polyphosphate composition is at least 2:1. Iron may be considered to be the only micronutrient when the composition comprises no more than 0.01 wt. % of each of chromium, cobalt, copper, manganese, and zinc. Manganese may be considered to be the only micronutrient when the composition comprises no more than 0.01 wt. % of each of chromium, cobalt, copper, iron, and zinc. Copper may be considered to be the only micronutrient when the composition comprises no more than 0.01 wt. % of each of chromium, cobalt, iron, manganese, and zinc.

The present invention is further directed to a water-insoluble, dilute acid-soluble inorganic polyphosphate composition in solid form, the inorganic polyphosphate composition containing at least 7 wt. % but not more than 35 wt. % of calcium and magnesium, in combination, and less than 5 wt. % of boron, chromium, cobalt, copper, iodine, iron, manganese, molybdenum, selenium, sulfur and zinc, in combination. In one such embodiment, the inorganic polyphosphate composition contains at least 7 wt. % but not more than 25 wt. % of calcium and magnesium, in combination The present invention is further directed to a water-insoluble, dilute acid-soluble inorganic polyphosphate composition in solid form, the inorganic polyphosphate composition containing calcium, magnesium, or a combination thereof, and optionally one or more micronutrients selected from boron, chromium, cobalt, copper, iodine, iron, manganese, molybdenum, selenium, sulfur and zinc, the inorganic polyphosphate having a ratio, A:P, having a value of 0.3:1 to 1.25:1 wherein A is the combined number of equivalents of calcium and magnesium incorporated in the inorganic polyphosphate composition and P is the number of equivalents of phosphorous, P, incorporated in the inorganic polyphosphate composition.

The present invention is further directed to an inorganic polyphosphate composition in solid form, the inorganic polyphosphate composition containing at least 7 wt. % but not more than 35 wt. % of calcium and magnesium, in combination, and optionally, one or more nutrients selected from boron, chromium, cobalt, copper, iodine, iron, manganese, molybdenum, selenium, sulfur and zinc, the inorganic polyphosphate composition having a solubility in room-temperature (25° C.) deionized water such that the combined amount of calcium, chromium, cobalt, copper, iron, magnesium, manganese, selenium and zinc that dissolves from the inorganic polyphosphate composition during a 30 minute period in deionized water at room-temperature (25° C.) is less than 20% of the combined amount of calcium, chromium, cobalt, copper, iron, magnesium, manganese, selenium and zinc that dissolves from the inorganic polyphosphate composition during a 30 minute period in 0.1 N HCl at room-temperature (25° C.). In one such embodiment, the inorganic polyphosphate composition contains at least 7 wt. % but not more than 25 wt. % of calcium and magnesium, in combination.

The present invention is further directed to an inorganic polyphosphate composition in solid form, the inorganic polyphosphate composition containing at least 7 wt. % but not more than 35 wt. % of calcium and magnesium, in combination, and optionally, one or more nutrients selected from boron, chromium, cobalt, copper, iodine, iron, manganese, molybdenum, selenium and zinc, the inorganic polyphosphate composition having a solubility in room-temperature (25° C.) deionized water such that the amount of phosphorus that dissolves from the inorganic polyphosphate composition during a 30 minute period in deionized water at room-temperature (25° C.) is less than 30 wt. % of the phosphorus that dissolves from the inorganic polyphosphate composition during a 30 minute period in 0.1N HCl at room-temperature (25° C.). In one such embodiment the amount of phosphorus that dissolves from the inorganic polyphosphate composition during a 30 minute period in deionized water at room-temperature (25° C.) is less than 25 wt. % of the phosphorus that dissolves from the inorganic polyphosphate composition during a 30 minute period in 0.1N HCl at room-temperature (25° C.). In another such embodiment the amount of phosphorus that dissolves from the inorganic polyphosphate composition during a 30 minute period in deionized water at room-temperature (25° C.) is less than 20 wt. % of the phosphorus, less than 15 wt. % that dissolves from the inorganic polyphosphate composition during a 30 minute period in 0.1N HCl at room-temperature (25° C.). In one such embodiment, the inorganic polyphosphate composition contains at least 7 wt. % but not more than 25 wt. % of calcium and magnesium, in combination.

The present invention is further directed to an inorganic polyphosphate composition in solid form, the inorganic polyphosphate composition containing at least 7 wt. % but not more than 35 wt. % of calcium and magnesium, in combination, and optionally, one or more nutrients selected from boron, chromium, cobalt, copper, iodine, iron, manganese, molybdenum, selenium and zinc, the inorganic polyphosphate composition having a solubility in room-temperature (25° C.) dilute citric acid such that the combined amount of calcium, chromium, cobalt, copper, iron, magnesium, manganese, selenium and zinc that dissolves from the inorganic polyphosphate composition during a 20 minute period in citric acid having a citric acid concentration not in excess of 2 wt. % citric acid at room-temperature (25° C.) is at least 75% of the combined amount of calcium, chromium, cobalt, copper, iron, magnesium, manganese, selenium and zinc that dissolves from the inorganic polyphosphate composition during a 20 minute period in 0.1N HCl at room-temperature (25° C.). In one such embodiment, the inorganic polyphosphate composition contains at least 7 wt. % but not more than 25 wt. % of calcium and magnesium, in combination.

The present invention is further directed to an inorganic polyphosphate composition in solid form, the inorganic polyphosphate composition containing at least 7 wt. % but not more than 35 wt. % of calcium and magnesium, in combination, and optionally, one or more nutrients selected from boron, chromium, cobalt, copper, iodine, iron, manganese, molybdenum, selenium and zinc, the inorganic polyphosphate composition having a solubility in room-temperature (25° C.) dilute citric acid such that the combined amount of calcium, chromium, cobalt, copper, iron, magnesium, manganese, selenium and zinc that dissolves from the inorganic polyphosphate composition during a 20 minute period in 0.2 wt. % citric acid at room-temperature (25° C.) is at least 75% of the combined amount of calcium, chromium, cobalt, copper, iron, magnesium, manganese, selenium and zinc that dissolves from the inorganic polyphosphate composition during a 20 minute period in 0.1N HCl at room-temperature (25° C.). In one such embodiment, the inorganic polyphosphate composition contains at least 7 wt. % but not more than 25 wt. % of calcium and magnesium, in combination.

The present invention is further directed to an inorganic polyphosphate composition in solid form, the inorganic polyphosphate composition containing at least 7 wt. % but not more than 35 wt. % of calcium and magnesium, in combination, and optionally, one or more nutrients selected from boron, chromium, cobalt, copper, iodine, iron, manganese, molybdenum, selenium and zinc, the inorganic polyphosphate composition having a solubility in room-temperature (25° C.) dilute citric acid such that the combined amount of calcium, chromium, cobalt, copper, iron, magnesium, manganese, selenium and zinc that dissolves from the inorganic polyphosphate composition during a 20 minute period in 0.1 wt. % citric acid at room-temperature (25° C.) is at least 75% of the combined amount of calcium, chromium, cobalt, copper, iron, magnesium, manganese, selenium and zinc that dissolves from the inorganic polyphosphate composition during a 20 minute period in 0.1N HCl at room-temperature (25° C.). In one such embodiment, the inorganic polyphosphate composition contains at least 7 wt. % but not more than 25 wt. % of calcium and magnesium, in combination.

The present invention is further directed to an inorganic polyphosphate composition in solid form, the inorganic polyphosphate composition containing at least 7 wt. % but not more than 35 wt. % of calcium and magnesium, in combination, and optionally, one or more nutrients selected from boron, chromium, cobalt, copper, iodine, iron, manganese, molybdenum, selenium and zinc, the inorganic polyphosphate composition having a solubility in room-temperature (25° C.) dilute ethylenediaminetetraacetic acid (EDTA) such that the combined amount of calcium, chromium, cobalt, copper, iron, magnesium, manganese, selenium and zinc that dissolves from the inorganic polyphosphate composition during a 20 minute period in 0.005M EDTA at room-temperature (25° C.) is at least 75% of the combined amount of calcium, chromium, cobalt, copper, iron, magnesium, manganese, selenium and zinc that dissolves from the inorganic polyphosphate composition during a 20 minute period in 0.1N HCl at room-temperature (25° C.). In one such embodiment, the inorganic polyphosphate composition contains at least 7 wt. % but not more than 25 wt. % of calcium and magnesium, in combination.

The present invention is further directed to an inorganic polyphosphate composition in solid form, the inorganic polyphosphate composition containing at least 7 wt. % but not more than 35 wt. % of calcium and magnesium, in combination, and optionally, one or more nutrients selected from boron, chromium, cobalt, copper, iodine, iron, manganese, molybdenum, selenium and zinc, the inorganic polyphosphate composition having a solubility in room-temperature (25° C.) dilute hydrochloric acid such that the combined amount of calcium, chromium, cobalt, copper, iron, magnesium, manganese, selenium and zinc that dissolves from the inorganic polyphosphate composition during a 20 minute period in 0.01 N HCl at room-temperature (25° C.) is at least 75% of the combined amount of calcium, chromium, cobalt, copper, iron, magnesium, manganese, selenium and zinc that dissolves from the inorganic polyphosphate composition during a 20 minute period in 0.1N HCl at room-temperature (25° C.). In one such embodiment, the inorganic polyphosphate composition contains at least 7 wt. % but not more than 25 wt. % of calcium and magnesium, in combination.

The present invention is further directed to an inorganic polyphosphate composition in solid form, the inorganic polyphosphate composition containing at least 7 wt. % but not more than 35 wt. % of calcium and magnesium, in combination, and optionally, one or more nutrients selected from boron, chromium, cobalt, copper, iodine, iron, manganese, molybdenum, selenium and zinc, the inorganic polyphosphate composition having a solubility in room-temperature (25° C.) dilute citric acid, dilute ethylenediaminetetraacetic acid (EDTA), and dilute hydrochloric acid such that the combined amount of calcium, chromium, cobalt, copper, iron, magnesium, manganese, selenium and zinc that dissolves from the inorganic polyphosphate composition during a 20 minute period in each of 0.1 wt. % citric acid, 0.2 wt. % citric acid, 0.005M EDTA and 0.01 N HCl at room-temperature (25° C.) is at least 75% of the combined amount of calcium, chromium, cobalt, copper, iron, magnesium, manganese, selenium and zinc that dissolves from the inorganic polyphosphate composition during a 20 minute period in 0.1N HCl at room-temperature (25° C.). In one such embodiment, the inorganic polyphosphate composition contains at least 7 wt. % but not more than 25 wt. % of calcium and magnesium, in combination.

Another aspect of the present invention is an inorganic polyphosphate composition in solid form comprising a calcium magnesium polyphosphate composition in solid crystalline form, characterized by having an X-ray diffraction reflection at one or more of the following positions: 5.96 (±0.03), 5.37 (±0.03), 5.01 (±0.025), 4.73, 4.61, 4.5, 4.15, 4.04, 3.7, 3.66(±0.01), 3.58(±0.01), 3.47(±0.01), 3.39(±0.01), 3.35(±0.01), 3.19(±0.01), 3.13(±0.01), 3.09(±0.01), 3.05(±0.01), 2.96(±0.009), 2.94(±0.009), 2.82 (±0.009), 2.76(±0.008), 2.73(±0.008), 2.59(±0.007), 2.53(±0.007), 2.5(±0.007), 2.43(±0.007), 2.41(±0.007), 2.37 (±0.007), 2.34(±0.006), 2.25(±0.006), 2.2(±0.006), 2.18(±0.005), 2.16(±0.005), 2.14(±0.005), 2.12(±0.005), 2.09(±0.005), 2.08(±0.005), 2.03(±0.005), 1.99(±0.004), 1.93(±0.004), 1.91(±0.004), 1.85(±0.003), 1.8(±0.003), 1.76 (±0.003), 1.72(±0.003), 1.68(±0.0028), 1.64(±0.0027), 1.59 (±0.0025), 1.57(±0.0024) Å.

Another aspect of the present invention is an inorganic polyphosphate composition in solid crystalline form comprising a calcium magnesium polyphosphate composition, characterized by having an X-ray diffraction reflection at one or more of the following positions: 7.54(±0.03), 6.74(±0.03), 5.96 (±0.03), 5.37 (±0.03), 5.01 (±0.025), 4.73, 4.61, 4.5, 4.15, 4.04, 3.7, 3.66(±0.01), 3.58(±0.01), 3.47(±0.01), 3.39 (±0.01), 3.35(±0.01), 3.19(±0.01), 3.13(±0.01), 3.09(±0.01), 3.05(±0.01), 2.96(±0.009), 2.94(±0.009), 2.82(±0.009), 2.76 (±0.008), 2.73(±0.008), 2.59(±0.007), 2.53(±0.007), 2.5(±0.007), 2.43(±0.007), 2.41(±0.007), 2.37(±0.007), 2.34 (±0.006), 2.25(±0.006), 2.2(±0.006), 2.18(±0.005), 2.16(±0.005), 2.14(±0.005), 2.12(±0.005), 2.09(±0.005), 2.08(±0.005), 2.03(±0.005), 1.99(±0.004), 1.93(±0.004), 1.91(±0.004), 1.85(±0.003), 1.8(±0.003), 1.76(±0.003), 1.72 (±0.003), 1.68(±0.0028), 1.64(±0.0027), 1.59(±0.0025), 1.57 (±0.0024) Å.

The present invention is further directed to an inorganic polyphosphate composition in solid form, the inorganic polyphosphate composition comprising one or more micronutrient metal(s) selected from the group consisting of chromium, cobalt, copper, iron, manganese, zinc and combinations thereof and phosphate, sulfate, borate, molybdate, or selenate repeat units, or a combination thereof, provided that the ratio of phosphate repeat units to the combined total of sulfate, borate, molybdate and selenate repeat units is at least 2:1. The water-insoluble, dilute acid-soluble inorganic polyphosphate composition has a ratio, M:Z, that is less than 0.4:1 wherein M is the combined number of equivalents of the micronutrient metal(s) in the water-insoluble, dilute acid-soluble inorganic polyphosphate composition and Z is the combined number of equivalents of phosphorous, sulfur, boron, molybdenum and selenium incorporated into the phosphate, sulfate, borate, molybdate or selenate repeat units. In one such embodiment, M:Z is less than 0.35:1.

The present invention is further directed to an inorganic polyphosphate composition in solid form, the inorganic polyphosphate composition comprising one or more micronutrient metal(s) selected from the group consisting of chromium, cobalt, copper, iron, manganese, zinc and combinations thereof with the ratio of the combined number of equivalents of the micronutrient metal(s), M, to the number of equivalents of phosphorous, P, in the micronutrient metal polyphosphate composition having a value of M:P wherein M:P is less than 0.4:1. In one such embodiment, M:P is less than 0.35:1.

The present invention is further directed to a water-insoluble, dilute acid-soluble inorganic polyphosphate composition in solid form, the inorganic polyphosphate composition containing calcium, magnesium, or a combination thereof, and less than 5 wt. % of boron, chromium, cobalt, copper, iodine, iron, manganese, molybdenum, selenium and zinc, in combination, wherein the inorganic polyphosphate composition is a free-flowing powder having a particle size distribution that is substantially less than 80 mesh BS.

The present invention is further directed to a water-insoluble, dilute acid-soluble inorganic polyphosphate composition in solid form, the inorganic polyphosphate composition containing calcium, magnesium, or a combination thereof, and less than 5 wt. % of boron, chromium, cobalt, copper, iodine, iron, manganese, molybdenum, selenium and zinc, in combination, the inorganic polyphosphate composition being a free-flowing powder having a moisture content of less than 10 wt. %. In one such embodiment the moisture content is less than 15 wt %. In another embodiment the moisture content is less than 20 wt. %.

Another aspect of the present invention is a fertilizer composition comprising the inorganic polyphosphate composition described in any of the preceding paragraphs.

Another aspect of the invention is a method of producing an inorganic polyphosphate composition described in any of the preceding paragraphs. The method comprises combining (i)

one or more sources of at least one of calcium and magnesium, (ii) phosphoric acid, and optionally, (iii) water to form a first mixture, and heating the first mixture to a temperature between about 80° C. and about 200° C. In one embodiment, the first mixture is heated to a temperature between about 80° C. and 130° C. The heated mixture is then preferably neutralized, for example with calcium oxide or, alternatively, hydroxides or carbonates of magnesium, ammonium, potassium or sodium.

Another aspect of the invention is a method of producing the inorganic polyphosphate composition described in any of the preceding paragraphs. The method comprises combining (i) one or more sources of at least one of calcium and magnesium, (ii) one or more sources of one or more micronutrients selected from boron, chromium, cobalt, copper, iodine, iron, manganese, molybdenum, potassium, seleniurri, sulfur and zinc, (iii) phosphoric acid, and optionally, (iv) water to form a first mixture, and heating the first mixture to a temperature between about 80° C. and about 200° C. In one embodiment, the first mixture is heated to a temperature between about 80° C. and 130° C. The heated mixture is then preferably neutralized, for example with calcium oxide or, alternatively, hydroxides or carbonates of magnesium, ammonium, potassium or sodium.

Another aspect of the invention is a method of producing the inorganic polyphosphate composition described in any of the preceding paragraphs. The method comprises combining (i) one or more sources of at least one of calcium and magnesium, (ii) one or more sources of one or more micronutrients selected from boron, chromium, cobalt, copper, iodine, iron, manganese, molybdenum, potassium, selenium, sulfur, and zinc, (iii) phosphoric acid, and optionally, (iv) water to form a first mixture, and heating the first mixture to a temperature between about 80° C. and about 200° C. In one embodiment, the first mixture is heated to a temperature between about 80° C. and 130° C. One or more sources of one or more micronutrients selected from boron, chromium, cobalt, copper, iodine, iron, manganese, molybdenum, selenium, and zinc are combined with the heated first mixture to form a second mixture, and the second mixture is heated to a temperature between about 70° C. and about 200° C. In one embodiment, the second mixture is heated to a temperature between about 80° C. and 130° C. The heated second mixture is then preferably neutralized, for example with calcium oxide or, alternatively, hydroxides or carbonates of magnesium, ammonium, potassium or sodium.

Another aspect of the invention is a method of producing the inorganic polyphosphate composition described in any of the preceding paragraphs. The method comprises combining (i) one or more sources of at least one of calcium and magnesium, (ii) one or more sources of one or more micronutrients selected from boron, chromium, cobalt, copper, iodine, iron, manganese, molybdenum, potassium, selenium, sulfur and zinc, (iii) phosphoric acid, and optionally, (iv) water to form a first mixture, and heating the first mixture to a temperature between about 80° C. and about 200° C. In one embodiment, the first mixture is heated to a temperature between about 80° C. and 130° C. The heated mixture is then preferably neutralized, for example with calcium oxide or, alternatively, hydroxides or carbonates of magnesium, ammonium, potassium or sodium.

Another aspect of the present invention is a method of preparing a fertilizer comprising combining a polyphosphate composition described in any of preceding paragraphs or elsewhere herein with a macronutrient fertilizer, carrier or diluent.

Another aspect of the present invention is a method of fertilizing soil comprising applying a polyphosphate composition described in any of the preceding paragraphs or elsewhere herein to the soil.

Another aspect of the present invention is feeding a polyphosphate composition described in any of the preceding paragraphs or elsewhere herein to an animal.

DETAILED DESCRIPTION OF THE PREFERRED EMBODIMENTS

Polyphosphate Compositions

The present invention is directed to water-insoluble, dilute acid-soluble inorganic polyphosphate polymeric compositions, fertilizers comprising such compositions, and methods of making and using such compositions. In general, the polyphosphate composition comprises calcium, magnesium or a combination thereof and, optionally, at least one micronutrient (also sometimes referred to herein as nutrients or nutrient ions) selected from among ammonium, boron, chromium, cobalt, copper, iodine, iron, manganese, molybdenum, potassium, selenium, sodium, sulfur, zinc, and combinations thereof. In a preferred embodiment, the water-insoluble, dilute acid-soluble inorganic polyphosphate polymeric compositions are in solid crystalline form.

In general, the inorganic polyphosphate compositions are relatively short-chain crystalline polyphosphates produced by incomplete polymerization of orthophosphates. Typically, therefore, the inorganic polyphosphate will contain at least about 5 wt. % orthophosphate. Although the inorganic polyphosphate may contain as much as 70 wt. % orthophosphate, it is generally preferred that the inorganic polyphosphate comprise substantially less. Thus, for example, in one embodiment the inorganic polyphosphate may contain 5 to 50 wt. % orthophosphate. By way of further example, in one embodiment the inorganic polyphosphate may contain 7.5 to 50 wt. % orthophosphate. By way of further example, in one embodiment the inorganic polyphosphate may contain 10 to 45 wt. % orthophosphate. By way of further example, in some embodiments, the inorganic polyphosphate may contain 7.5 to 30 wt. % orthophosphate. By way of further example, in some embodiments, the inorganic polyphosphate may contain 10 to 30 wt. % orthophosphate. By way of further example, in some embodiments, the inorganic polyphosphate may contain 15 to 30 wt. % orthophosphate. By way of further example, in some embodiments, the inorganic polyphosphate may contain 10 to 25 wt. % orthophosphate. By way of further example, in some embodiments, the inorganic polyphosphate may contain 15 to 25 wt. % orthophosphate.

The inorganic polyphosphate compositions contain phosphate repeat units and may optionally also contain sulfate, borate, molybdate or selenate repeat units, or a combination thereof. Typically, the ratio of phosphate repeat units to the combined total of sulfate, borate, molybdate and selenate repeat units in the inorganic polyphosphate composition is at least 2:1 (phosphate:sulfate+borate+molybdate+selenate). For example, in certain embodiments, the ratio of phosphate repeat units to the combined total of sulfate, borate, molybdate and selenate repeat units in the inorganic polyphosphate composition is at least 2.5:1. By way of further example, in some embodiments the ratio of phosphate repeat units to the combined total of sulfate, borate, molybdate and selenate repeat units in the inorganic polyphosphate composition is at least 3:1. By way of further example, in some embodiments the ratio of phosphate repeat units to the combined total of sulfate, borate, molybdate and selenate repeat units in the inorganic polyphosphate composition will be between 2:1 and 5:1. By way of further example, in some embodiments the ratio of phosphate repeat units to the combined total of sulfate, borate, molybdate and selenate repeat units in the inorganic polyphosphate composition will be between 2:1 and 10:1. By way of further example, in some embodiments the ratio of phosphate repeat units to the sulfate repeat units in the inorganic polyphosphate composition will be between 2:1 and 5:1. By way of further example, in some embodiments the ratio of phosphate repeat units to the sulfate repeat units in the inorganic polyphosphate composition will be between 2:1 and 10:1.

Depending upon the extent of polymerization, the inorganic polyphosphates may have a range of chain lengths. When the calculation is based upon total phosphate content (i.e., including the orthophosphate content of the polyphosphate), the average chain length (number average) may be in the range of about 1.1 and 50 repeat units (phosphate, sulfate, borate, molybdate and/or selenate repeat units) per chain. For example, in one embodiment the average chain length (number average) may be 1.2 to 25 repeat units (phosphate, sulfate, borate, molybdate and/or selenate repeat units) per chain based upon total phosphate content. By way of further example, in one embodiment the average chain length (number average) may be 1.2 to 20 repeat units (phosphate, sulfate, borate, molybdate and/or selenate repeat units) per chain based upon total phosphate content. By way of further example, in one embodiment the average chain length (number average) may be 1.2 to 15 repeat units (phosphate, sulfate, borate, molybdate and/or selenate repeat units) per chain based upon total phosphate content. By way of further example, in one embodiment the average chain length (number average) may be 2 to 20 repeat units (phosphate, sulfate, borate, molybdate and/or selenate repeat units) per chain based upon total phosphate content. By way of further example, in one embodiment the average chain length (number average) may be 2 to 15 repeat units (phosphate, sulfate, borate, molybdate and/or selenate repeat units) per chain based upon total phosphate content. By way of further example, in one embodiment the average chain length (number average) may be 2 to 10 repeat units (phosphate, sulfate, borate, molybdate and/or selenate repeat units) per chain based upon total phosphate content. By way of further example, in one embodiment the average chain length (number average) may be 2.5 to 15 repeat units (phosphate, sulfate, borate, molybdate and/or selenate repeat units) per chain based upon total phosphate content. By way of further example, in one embodiment the average chain length (number average) may be 2.5 to 10 repeat units (phosphate, sulfate, borate, molybdate and/or selenate repeat units) per chain based upon total phosphate content. By way of further example, in one embodiment the average chain length (number average) may be 3 to 15 repeat units (phosphate, sulfate, borate, molybdate and/or selenate repeat units) per chain based upon total phosphate content. By way of further example, in one embodiment the average chain length (number average) may be 3 to 10 repeat units (phosphate, sulfate, borate, molybdate and/or selenate repeat units) per chain based upon total phosphate content. By way of further example, in one embodiment the average chain length (number average) may be 1.2 to 5 repeat units (phosphate, sulfate, borate, molybdate and/or selenate repeat units) per chain based upon total phosphate content. By way of further example, in one embodiment the average chain length (number average) may be 1.3 to 4 repeat units (phosphate, sulfate, borate, molybdate and/or selenate repeat units) per chain based upon total phosphate content. By way of further example, in one embodiment the average chain length (number average) may be 1.3 to 2.9 repeat units (phosphate, sulfate, borate, molybdate and/or selenate repeat units) per chain based upon total phosphate content.

In certain embodiments, when the calculation is based upon total phosphate content (i.e., including the orthophosphate content of the polyphosphate), the average chain length (number average) may be in the range of about 1.1 and 50 phosphate units (phosphorus atoms) per chain. For example, in one embodiment the average chain length (number average) may be 1.2 to 25 phosphate units (phosphorus atoms) per chain based upon total phosphate content. By way of further example, in one embodiment the average chain length (number average) may be 1.2 to 20 phosphate units (phosphorus atoms) per chain based upon total phosphate content. By way of further example, in one embodiment the average chain length (number average) may be 1.2 to 15 phosphate units (phosphorus atoms) per chain based upon total phosphate content. By way of further example, in one embodiment the average chain length (number average) may be 2 to 20 phosphate units (phosphorus atoms) per chain based upon total phosphate content. By way of further example, in one embodiment the average chain length (number average) may be 2 to 15 phosphate units (phosphorus atoms) per chain based upon total phosphate content. By way of further example, in one embodiment the average chain length (number average) may be 2 to 10 phosphate units (phosphorus atoms) per chain based upon total phosphate content. By way of further example, in one embodiment the average chain length (number average) may be 2.5 to 15 phosphate units (phosphorus atoms) per chain based upon total phosphate content. By way of further example, in one embodiment the average chain length (number average) may be 2.5 to 10 phosphate units (phosphorus atoms) per chain based upon total phosphate content. By way of further example, in one embodiment the average chain length (number average) may be 3 to 15 phosphate units (phosphorus atoms) per chain based upon total phosphate content. By way of further example, in one embodiment the average chain length (number average) may be 1.2 to 5 phosphate units (phosphorus atoms) per chain based upon total phosphate content. By way of further example, in one embodiment the average chain length (number average) may be 1.3 to 4 phosphate units (phosphorus atoms) per chain based upon total phosphate content. By way of further example, in one embodiment the average chain length (number average) may be 1.3 to 2.9 phosphate units (phosphorus atoms) per chain based upon total phosphate content.

When the calculation is based upon upon the non-orthophosphate fraction of the polyphosphate, (i.e., excluding the orthophosphate fraction of the polyphosphate from the calculation), the average chain length (number average) may be in the range of about 2 and the average chain length (number average) may be in the range of about 1.2 and 50 repeat units (phosphate, sulfate, borate, molybdate and/or selenate repeat units) per chain based upon the non-orthophosphate fraction of the polyphosphate. For example, in one embodiment the average chain length (number average) may be 1.2 to 25 repeat units (phosphate, sulfate, borate, molybdate and/or selenate repeat units) per chain based upon the non-orthophosphate fraction of the polyphosphate. By way of further example, in one embodiment the average chain length (number average) may be 1.2 to 20 repeat units (phosphate, sulfate, borate, molybdate and/or selenate repeat units) per chain based upon the non-orthophosphate fraction of the polyphosphate. By way of further example, in one embodiment the average chain length (number average) may be 1.2 to 15 repeat units (phosphate, sulfate, borate, molybdate and/or selenate repeat units) per chain based upon the non-orthophosphate fraction of the polyphosphate. By way of further example, in one embodiment the average chain length (number average) may be 2 to 20 repeat units (phosphate, sulfate, borate, molybdate and/or selenate repeat units) per chain based upon the non-orthophosphate fraction of the polyphosphate. By way of further example, in one embodiment the average chain length (number average) may be 2 to 15 repeat units (phosphate, sulfate, borate, molybdate and/or selenate repeat units) per chain based upon the non-orthophosphate fraction of the polyphosphate. By way of further example, in one embodiment the average chain length (number average) may be 2 to 10 repeat units (phosphate, sulfate, borate, molybdate and/or selenate repeat units) per chain based upon the non-orthophosphate fraction of the polyphosphate. By way of further example, in one embodiment the average chain length (number average) may be 2.5 to 15 repeat units (phosphate, sulfate, borate, molybdate and/or selenate repeat units) per chain based upon the non-orthophosphate fraction of the polyphosphate. By way of further example, in one embodiment the average chain length (number average) may be 2.5 to 10 repeat units (phosphate, sulfate, borate, molybdate and/or selenate repeat units) per chain based upon the non-orthophosphate fraction of the polyphosphate. By way of further example, in one embodiment the average chain length (number average) may be 3 to 15 repeat units (phosphate, sulfate, borate, molybdate and/or selenate repeat units) per chain based upon the non-orthophosphate fraction of the polyphosphate. By way of further example, in one embodiment the average chain length (number average) may be 3 to 10 repeat units (phosphate, sulfate, borate, molybdate and/or selenate repeat units) per chain based upon the non-orthophosphate fraction of the polyphosphate. By way of further example, in one embodiment the average chain length (number average) may be 2.1 to 10 repeat units (phosphate, sulfate, borate, molybdate and/or selenate repeat units) per chain based upon the non-orthophosphate fraction of the polyphosphate. By way of further example, in one embodiment the average chain length (number average) may be 2.5 to 7 repeat units (phosphate, sulfate, borate, molybdate and/or selenate repeat units) per chain based upon the non-orthophosphate fraction of the polyphosphate. By way of further example, in one embodiment the average chain length (number average) may be 2.5 to 5 repeat units (phosphate, sulfate, borate, molybdate and/or selenate repeat units) per chain based upon the non-orthophosphate fraction of the polyphosphate.

In some embodiments in which the calculation is based upon the non-orthophosphate fraction of the polyphosphate, (i.e., excluding the orthophosphate fraction of the polyphosphate from the calculation), the average chain length (number average) may be in the range of about 2 and 50 phosphate units (phosphorus atoms) per chain. For example, in one embodiment the average chain length (number average) may be 2 to 25 phosphate units (phosphorus atoms) per chain based upon the non-orthophosphate fraction of the polyphosphate. By way of further example, in one embodiment the average chain length (number average) may be 2 to 20 phosphate units (phosphorus atoms) per chain based upon the non-orthophosphate fraction of the polyphosphate. By way of further example, in one embodiment the average chain length (number average) may be 2 to 15 phosphate units (phosphorus atoms) per chain based upon the non-orthophosphate fraction of the polyphosphate. By way of further example, in one embodiment the average chain length (number average) may be 2 to 10 phosphate units (phosphorus atoms) per chain based upon the non-orthophosphate fraction of the polyphosphate. By way of further example, in one embodiment the average chain length (number average) may be 2.5 to 20 phosphate units (phosphorus atoms) per chain based upon the non-orthophosphate fraction of the polyphosphate. By way of further example, in one embodiment the average chain length (number average) may be 2.5 to 15 phosphate units (phosphorus atoms) per chain based upon the non-orthophosphate fraction of the polyphosphate. By way of further example, in one embodiment the average chain length (number average) may be 2.5 to 10 phosphate units (phosphorus atoms) per chain based upon the non-orthophosphate fraction of the polyphosphate. By way of further example, in one embodiment the average chain length (number average) may be 3 to 20 phosphate units (phosphorus atoms) per chain based upon the non-orthophosphate fraction of the polyphosphate. By way of further example, in one embodiment the average chain length (number average) may be 3 to 15 phosphate units (phosphorus atoms) per chain based upon the non-orthophosphate fraction of the polyphosphate. By way of further example, in one embodiment the average chain length (number average) may be 3 to 10 phosphate units (phosphorus atoms) per chain based upon the non-orthophosphate fraction of the polyphosphate. By way of further example, in one embodiment the average chain length (number average) may be 3.5 to 20 phosphate units (phosphorus atoms) per chain based upon the non-orthophosphate fraction of the polyphosphate. By way of further example, in one embodiment the average chain length (number average) may be 3.5 to 15 phosphate units (phosphorus atoms) per chain based upon the non-orthophosphate fraction of the polyphosphate. By way of further example, in one embodiment the average chain length (number average) may be 3.5 to 10 phosphate units (phosphorus atoms) per chain based upon the non-orthophosphate fraction of the polyphosphate. By way of further example, in one embodiment the average chain length (number average) may be 4 to 20 phosphate units (phosphorus atoms) per chain based upon the non-orthophosphate fraction of the polyphosphate. By way of further example, in one embodiment the average chain length (number average) may be 4 to 15 phosphate units (phosphorus atoms) per chain based upon the non-orthophosphate fraction of the polyphosphate. By way of further example, in one embodiment the average chain length (number average) may be 4 to 10 phosphate units (phosphorus atoms) per chain based upon the non-orthophosphate fraction of the polyphosphate. By way of further example, in one embodiment the average chain length (number average) may be 4 to 9 phosphate units (phosphorus atoms) per chain based upon the non-orthophosphate fraction of the polyphosphate. By way of further example, in one embodiment the average chain length (number average) may be 4 to 8 phosphate units (phosphorus atoms) per chain based upon the non-orthophosphate fraction of the polyphosphate. By way of further example, in one embodiment the average chain length (number average) may be 2.1 to 50 phosphate units (phosphorus atoms) per chain based upon the non-orthophosphate fraction of the polyphosphate. By way of further example, in one embodiment the average chain length (number average) may be 2.1 to 10 phosphate units (phosphorus atoms) per chain based upon the non-orthophosphate fraction of the polyphosphate. By way of further example, in one embodiment the average chain length (number average) may be 2.5 to 7 phosphate units (phosphorus atoms) per chain based upon the non-orthophosphate fraction of the polyphosphate. By way of further example, in one embodiment the average chain length (number average) may be 2.5 to 5 phosphate units (phosphorus atoms) per chain based upon the non-orthophosphate fraction of the polyphosphate.

On a molar basis, the polyphosphate composition also preferably contains at least 0.5 phosphate/sulfate/borate/molybdate/selenate repeat units (i.e., the combined total of phosphate, sulfate, borate, molybdate and selenate repeat units) for each atom of calcium and magnesium (in combination). In one exemplary embodiment, the polyphosphate composition contains at least 0.66 phosphate/sulfate/borate/molybdate/selenate repeat units (i.e., the combined total of phosphate, sulfate, borate, molybdate and selenate repeat units) for each atom of calcium and magnesium (in combination). By way of further example, in one embodiment, the polyphosphate composition contains at least 0.75 phosphate/sulfate/borate/molybdate/selenate repeat units for each atom of calcium and magnesium (in combination). By way of further example, in one embodiment, the polyphosphate composition contains at least 0.825 phosphate/sulfate/borate/molybdate/selenate repeat units for each atom of calcium and magnesium (in combination). By way of further example, in one embodiment, the polyphosphate composition contains at least 0.95 phosphate/sulfate/borate/molybdate/selenate repeat units for each atom of calcium and magnesium (in combination). By way of further example, in one embodiment, the polyphosphate composition contains no more than one alkaline earth metal atom selected from the group consisting of calcium, magnesium and a combination thereof for each phosphate/sulfate/borate/molybdate/selenate repeat units of the inorganic polyphosphate composition. By way of further example, in one embodiment, the polyphosphate composition contains at least 1.11 phosphate/sulfate/borate/molybdate/selenate repeat units for each atom of calcium and magnesium (in combination). By way of further example, in one embodiment, the polyphosphate composition may contain about 1.33 phosphate/sulfate/borate/molybdate/selenate repeat units for each atom of calcium and magnesium (in combination). By way of further example, in one embodiment, the polyphosphate composition may contain about 1.67 phosphate/sulfate/borate/molybdate/selenate repeat units for each atom of calcium and magnesium (in combination). By way of further example, in one embodiment, the polyphosphate composition may contain about 2.22 phosphate/sulfate/borate/molybdate/selenate repeat units for each atom of calcium and magnesium (in combination). In general, however, the upper limit of the ratio of phosphate/sulfate/borate/molybdate/selenate repeat units to calcium and magnesium atoms is the ratio that would lead to the formation of the corresponding dihydrogen orthophosphate.

In one embodiment, on a molar basis, the polyphosphate composition preferably contains at least 0.5 phosphate repeat units for each atom of calcium and magnesium (in combination). In one exemplary embodiment, the polyphosphate composition contains at least 0.66 phosphate units (phosphorous atom) for each atom of calcium and magnesium (in combination). By way of further example, in one embodiment, the polyphosphate composition contains at least 0.75 phosphate units (phosphorous atom) for each atom of calcium and magnesium (in combination). By way of further example, in one embodiment, the polyphosphate composition contains at least 0.825 phosphate units (phosphorous atom) for each atom of calcium and magnesium (in combination). By way of further example, in one embodiment, the polyphosphate composition contains at least 0.95 phosphate units (phosphorous atom) for each atom of calcium and magnesium (in combination). By way of further example, in one embodiment, the polyphosphate composition contains no more than one alkaline earth metal atom selected from the group consisting of calcium, magnesium and a combination thereof for each phosphate unit (phosphorous atom) of the inorganic polyphosphate composition. In one exemplary embodiment, the polyphosphate composition contains By way of further example, in one embodiment, the polyphosphate composition contains at least 1.11 phosphate units (phosphorous atom) for each atom of calcium and magnesium (in combination). By way of further example, in one embodiment, the polyphosphate composition may contain about 1.33 phosphate units (phosphorous atoms) for each atom of calcium and magnesium (in combination). By way of further example, in one embodiment, the polyphosphate composition may contain about 1.67 phosphate units (phosphorous atoms) for each atom of calcium and magnesium (in combination). By way of further example, in one embodiment, the polyphosphate composition may contain about 2.22 phosphate units (phosphorous atoms) for each atom of calcium and magnesium (in combination). In general, however, the upper limit of the ratio of phosphate units (phosphorous atoms) to calcium and magnesium atoms is the ratio that would lead to the formation of the corresponding dihydrogen orthophosphate.

In general, it is preferred that inorganic polyphosphate composition contain calcium, magnesium, or a combination thereof, and that the inorganic polyphosphate have a ratio, A:Z, having a value of at least 0.3:1, wherein A is the combined number of equivalents of calcium and magnesium incorporated in the inorganic polyphosphate composition and Z is the combined number of equivalents of phosphate, sulfate, borate, molybdate, and selenate repeat units incorporated in the inorganic polyphosphate composition. In one exemplary embodiment, A:Z is at least 0.4:1. In another exemplary embodiment, A:Z is at least 0.45:1. In another exemplary embodiment, A:Z is at least 0.5:1. In another exemplary embodiment, A:Z is at least 0.52:1. In another exemplary embodiment, A:Z is at least 0.5:1. In another exemplary embodiment, A:Z is at least 0.5:1. In another exemplary embodiment, A:Z is at least 0.6:1. In another exemplary embodiment, A:Z is at least 0.5:1. In another exemplary embodiment, A:Z is at least 0.65:1. In another exemplary embodiment, A:Z is at least 0.7:1. In another exemplary embodiment, A:Z is at least 0.5:1. In another exemplary embodiment, A:Z is at least 0.8:1. In another exemplary embodiment, A:Z is at least 0.9:1. In general, however, A:Z will not exceed 1.25:1, with ratios in the range of about 0.5:1 to about 1:1 or even about 0.5:1 to about 0.75:1 being more typical. For example, in each of the foregoing embodiments, the inorganic polyphosphate composition may comprise phosphate repeat units and sulfate repeat units. By way of further example, in each of the foregoing embodiments, the inorganic polyphosphate composition may comprise phosphate repeat units and sulfate repeat units with the ratio of phosphate repeat units to sulfate repeat units being between 10:1 and 2:1.

In some embodiments, the ratio of the number of equivalents of calcium and magnesium, in combination, for each equivalent of phosphate in the polyphosphate composition is two-thirds of the value of the corresponding molar ratio. Stated differently, it is generally preferred that inorganic polyphosphate composition contain calcium, magnesium, or a combination thereof, and that the inorganic polyphosphate have a ratio, A:P, having a value of at least 0.3:1, wherein A is the combined number of equivalents of calcium and magnesium incorporated in the inorganic polyphosphate composition and P is the number of equivalents of phosphorous, P, incorporated in the inorganic polyphosphate composition. In one exemplary embodiment, A:P is at least 0.4:1. In another exemplary embodiment, A:P is at least 0.45:1. In another exemplary embodiment, A:P is at least 0.5:1. In another exemplary embodiment, A:P is at least 0.52:1. In another exemplary embodiment, A:P is at least 0.5:1. In another exemplary embodiment, A:P is at least 0.5:1. In another exemplary embodiment, A:P is at least 0.6:1. In another exemplary embodiment, A:P is at least 0.5:1. In another exemplary embodiment, A:P is at least 0.65:1. In another exemplary embodiment, A:P is at least 0.7:1. In another exemplary embodiment, A:P is at least 0.5:1. In another exemplary embodiment, A:P is at least 0.8:1. In another exemplary embodiment, A:P is at least 0.9:1. In general, however, A:P will not exceed 1:1, with ratios in the range of about 0.5:1 to about 0.75:1 being more typical.

Considered on a weight basis, it is generally preferred that the inorganic polyphosphate composition comprise at least 7 weight percent of an alkaline earth metal selected from calcium, magnesium and a combination thereof, based upon the total weight of the polyphosphate. Typically, however, the polyphosphate composition will contain less than about 25 weight percent of calcium and magnesium, in combination. By way of further example, in this embodiment, the polyphosphate composition may contain less than 35 wt. % of calcium and magnesium, in combination. Thus, for example, in one embodiment the polyphosphate composition comprises at least 7 wt. % calcium and no, or only trace amounts of magnesium. By way of further example, in this embodiment, the polyphosphate composition may contain at least 10 wt. % calcium and no, or only trace amounts of magnesium. By way of further example, in this embodiment, the polyphosphate composition may contain at least 12 wt. % calcium and no, or only trace amounts of magnesium. By way of further example, in this embodiment, the polyphosphate composition may contain at least 15 wt. % calcium and no, or only trace amounts of magnesium. By way of further example, in this embodiment, the polyphosphate composition may contain at least 20 wt. % calcium and no, or only trace amounts of magnesium. Alternatively, in one embodiment, the polyphosphate composition comprises at least 7 wt. % magnesium and no, or only trace amounts of calcium. By way of further example, in this embodiment, the polyphosphate composition may contain at least 10 wt. % magnesium and no, or only trace amounts of calcium. By way of further example, in this embodiment, the polyphosphate composition may contain at least 12 wt. % magnesium and no, or only trace amounts of calcium. By way of further example, in this embodiment, the polyphosphate composition may contain at least 15 wt. % magnesium and no, or only trace amounts of calcium. By way of further example, in this embodiment, the polyphosphate composition may contain at least 20 wt. % magnesium and no, or only trace amounts of calcium. In yet another embodiment, the polyphosphate composition contains more than trace amounts of each of calcium and magnesium and, in combination, calcium and magnesium constitute at least 7 wt. % of the total weight of the composition. For example, in one embodiment, the polyphosphate composition contains more than trace amounts of each of calcium and magnesium and, in combination, calcium and magnesium constitute at least 12 wt. % of the total weight of the composition. By way of further example, in one embodiment, the polyphosphate composition contains more than trace amounts of each of calcium and magnesium and, in combination, calcium and magnesium constitute at least 15 wt. % of the total weight of the composition. By way of further example, in one embodiment, the polyphosphate composition contains more than trace amounts of each of calcium and magnesium and, in combination, calcium and magnesium constitute at least 20 wt. % of the total weight of the composition.

In general, when the composition contains both calcium and magnesium, it is generally preferred that the atomic ratio of calcium to magnesium be greater than 0.2:1 (calcium:magnesium). For example, the atomic ratio of calcium to magnesium may be greater than 0.5:1 (calcium:magnesium). In certain embodiments, the composition contains more calcium than magnesium. Thus, for example, the atomic ratio of calcium to magnesium may exceed 1.25:1 (calcium:magnesium). In one such preferred embodiment, the atomic ratio of calcium to magnesium exceeds 1.5:1 (calcium:magnesium). In one such preferred embodiment, the atomic ratio of calcium to magnesium exceeds 1.75:1 (calcium:magnesium). In one such preferred embodiment, the atomic ratio of calcium to magnesium exceeds 2:1 (calcium:magnesium). In one such preferred embodiment, the atomic ratio of calcium to magnesium exceeds 4:1 (calcium:magnesium). In one such preferred embodiment, the atomic ratio of calcium to magnesium exceeds 5:1 (calcium:magnesium).

Advantageously, the polyphosphates of the present invention are water-insoluble. That is, the phosphates do not appreciably dissolve in deionized water at room temperature (25° C.) water and neutral pH; for example, the polyphosphates will not release more than 20% of the combined amounts of calcium and magnesium contained by the polyphosphate composition within 10 minutes, and preferably within an hour. Water-insolubility may be conveniently assessed, for example, by reference to the dissolution of the polyphosphate in moderate strength mineral acid. For example, the combined amounts of calcium and magnesium (and any micronutrient metals selected from the group consisting of chromium, cobalt, copper, iron, manganese, selenium and zinc) contained by the polyphosphate composition that dissolves from the inorganic polyphosphate composition during a 30 minute period in deionized water at room-temperature (25° C.) is less than 20% (by weight) of the combined amount of calcium and magnesium (and any micronutrient metals selected chromium, cobalt, copper, iron, manganese, selenium and zinc) that dissolves from the inorganic polyphosphate composition during a 30 minute period in 0.1N HCl at room-temperature (25° C.). In one preferred embodiment, the amount of such metals that dissolve in DI water is less than 15% of the amount of such metals that dissolve in 0.1N HCl under such conditions. In one preferred embodiment, the amount of such metals that dissolve in DI water is less than 10% of the amount of such metals that dissolve in 0.1 N HCl under such conditions. In one preferred embodiment, the amount of such metals that dissolve in DI water is less than 9% of the amount of such metals that dissolve in 0.1N HCl under such conditions. In one preferred embodiment, the amount of such metals that dissolve in DI water is less than 8% of the amount of such metals that dissolve in 0.1N HCl under such conditions.

The polyphosphates dissolve relatively rapidly at room temperature in dilute citric acid. Stated differently, the extent of dissolution in a one hour period in dilute citric acid, such as 2 wt. %, 1 wt. % or even 0.2 wt % or 0.1 wt. % citric acid, at room temperature is a substantial fraction of the extent of dissolution in significantly stronger acids such as 0.1N HCl acid at room temperature. For example, the combined amount of calcium and magnesium (and any chromium, cobalt, copper, iron, manganese, selenium and zinc) that dissolves from the inorganic polyphosphate composition during a 20 minute period in 2 wt. % citric acid at room-temperature (25° C.) is at least 75% of the combined amount of calcium and magnesium (and any chromium, cobalt, copper, iron, manganese, selenium and zinc) that dissolves from the inorganic polyphosphate composition during a 20 minute period in 0.1N HCl at room-temperature (25° C.); in certain more preferred embodiments, the amount that dissolves in the 2 wt. % citric acid is at 80%, 85%, 90% or even 95% of the combined amount of calcium and magnesium (and any chromium, cobalt, copper, iron, manganese, selenium and zinc) that dissolves from the inorganic polyphosphate composition during a 20 minute period in 0.1N HCl at room-temperature (25° C.). By way of further example, in one embodiment the combined amount of calcium and magnesium (and any chromium, cobalt, copper, iron, manganese, selenium and zinc) that dissolves from the inorganic polyphosphate composition during a 20 minute period in 1 wt. % citric acid at room-temperature (25° C.) is at least 75% of the combined amount of calcium and magnesium (and any chromium, cobalt, copper, iron, manganese, selenium and zinc) that dissolves from the inorganic polyphosphate composition during a 20 minute period in 0.1N HCl at room-temperature (25° C.); in certain more preferred embodiments, the amount that dissolves in the 1 wt. % citric acid is at 80%, 85%, 90% or even 95% of the combined amount of calcium and magnesium (and any chromium, cobalt, copper, iron, manganese, selenium and zinc) that dissolves from the inorganic polyphosphate composition during a 20 minute period in 0.1N HCl at room-temperature (25° C.). By way of further example, in one embodiment the combined amount of calcium and magnesium (and any chromium, cobalt, copper, iron, manganese, selenium and zinc) that dissolves from the inorganic polyphosphate composition during a 20 minute period in 0.2 wt. % citric acid at room-temperature (25° C.) is at least 75% of the combined amount of calcium and magnesium (and any chromium, cobalt, copper, iron, manganese, selenium and zinc) that dissolves from the inorganic polyphosphate composition during a 20 minute period in 0.1N HCl at room-temperature (25° C.); in certain more preferred embodiments, the amount that dissolves in the 0.2 wt. % citric acid is at 80%, 85%, 90% or even 95% of the combined amount of calcium and magnesium (and any chromium, cobalt, copper, iron, manganese, selenium and zinc) that dissolves from the inorganic polyphosphate composition during a 20 minute period in 0.1N HCl at room-temperature (25° C.). By way of further example, in one embodiment the combined amount of calcium and magnesium (and any chromium, cobalt, copper, iron, manganese, selenium and zinc) that dissolves from the inorganic polyphosphate composition during a 20 minute period in 0.1 wt. % citric acid at room-temperature (25° C.) is at least 75% of the combined amount of calcium and magnesium (and any chromium, cobalt, copper, iron, manganese, selenium and zinc) that dissolves from the inorganic polyphosphate composition during a 20 minute period in 0.1N HCl at room-temperature (25° C.); in certain more preferred embodiments, the amount that dissolves in the 0.1 wt. % citric acid is at 80%, 85%, 90% or even 95% of the combined amount of calcium and magnesium (and any chromium, cobalt, copper, iron, manganese, selenium and zinc) that dissolves from the inorganic polyphosphate composition during a 20 minute period in 0.1N HCl at room-temperature (25° C.)

In one embodiment, the polyphosphate composition preferably also dissolves relatively rapidly at room temperature in dilute ethylenediaminetetraacetic acid (EDTA). Stated differently, the extent of dissolution in a one hour period in 0.005 M EDTA is preferably a substantial fraction of the extent of dissolution in significantly stronger acids such as 0.1N HCl acid at room temperature. For example, the combined amount of calcium and magnesium (and any chromium, cobalt, copper, iron, manganese, selenium and zinc) that dissolves from the inorganic polyphosphate composition during a 20 minute period in 0.005M EDTA at room-temperature (25° C.) is at least 75% of the combined amount of calcium and magnesium (and any chromium, cobalt, copper, iron, manganese, selenium and zinc) that dissolves from the inorganic polyphosphate composition during a 20 minute period in 0.1N HCl at room-temperature (25° C.). In one preferred embodiment, the amount of such metals that dissolve in 0.005M EDTA is at least 80% of the amount of such metals that dissolve in 0.1 N HCl under such conditions. In one preferred embodiment, the amount of such metals that dissolve in 0.005M EDTA is at least 85% of the amount of such metals that dissolve in 0.1N HCl under such conditions. In one preferred embodiment, the amount of such metals that dissolve in 0.005M EDTA is at least 90% of the amount of such metals that dissolve in 0.1 N HCl under such conditions. In one preferred embodiment, the amount of such metals that dissolve in 0.005M EDTA is at least 95% of the amount of such metals that dissolve in 0.1N HCl under such conditions.

In one embodiment, the polyphosphate composition preferably also dissolves relatively rapidly at room temperature in dilute HCl. Stated differently, the extent of dissolution in a one hour period in 0.01N HCl at room temperature is a substantial fraction of the extent of dissolution in significantly stronger acids such as 0.1 N HCl acid at room temperature. For example, the combined amount of calcium and magnesium (and any chromium, cobalt, copper, iron, manganese, selenium and zinc) that dissolves from the inorganic polyphosphate composition during a 20 minute period in 0.01 N HCl at room-temperature (25° C.) is at least 75% of the combined amount of calcium and magnesium (and any chromium, cobalt, copper, iron, manganese, selenium and zinc) that dissolves from the inorganic polyphosphate composition during a 20 minute period in 0.1N HCl at room-temperature (25° C.). In one preferred embodiment, the amount of such metals that dissolve in 0.01 N HCl is at least 80% of the amount of such metals that dissolve in 0.1N HCl under such conditions. In one preferred embodiment, the amount of such metals that dissolve in 0.01 N HCl is at least 85% of the amount of such metals that dissolve in 0.1N HCl under such conditions. In one preferred embodiment, the amount of such metals that dissolve in 0.01 N HCl is at least 90% of the amount of such metals that dissolve in 0.1N HCl under such conditions. In one preferred embodiment, the amount of such metals that dissolve in 0.01 N HCl is at least 95% of the amount of such metals that dissolve in 0.1N HCl under such conditions.

In one embodiment, the polyphosphate composition dissolves relatively rapidly at room temperature in 0.2 wt. % citric acid, 0.005M EDTA and 0.01N HCl. In addition, the extent of dissolution in a one hour period in dilute acids such as 0.2 wt. % citric acid, 0.005M EDTA and 0.01N HCl at room temperature is a substantial fraction of the extent of dissolution in significantly stronger acids such as 0.1 N HCl acid at room temperature. For example, the combined amount of calcium and magnesium (and any chromium, cobalt, copper, iron, manganese, selenium and zinc) that dissolves from the inorganic polyphosphate composition during a 20 minute period in each of 0.2 wt. % citric acid, 0.005M EDTA and 0.01 N HCl at room-temperature (25° C.) is at least 75% of the combined amount of calcium and magnesium (and any chromium, cobalt, copper, iron, manganese, selenium and zinc) that dissolves from the inorganic polyphosphate composition during a 20 minute period in 0.1N HCl at room-temperature (25° C.). In one preferred embodiment, the amount of such metals that dissolve in each of the dilute acids is at least 80% of the amount of such metals that dissolve in 0.1 N HCl under such conditions. In one preferred embodiment, the amount of such metals that dissolve in each of the dilute acids is at least 85% of the amount of such metals that dissolve in 0.1 N HCl under such conditions. In one preferred embodiment, the amount of such metals that dissolve in each of the dilute acids is at least 90% of the amount of such metals that dissolve in 0.1N HCl under such conditions. In one preferred embodiment, the amount of such metals that dissolve in each of the dilute acids is at least 95% of the amount of such metals that dissolve in 0.1N HCl under such conditions.

In one embodiment, the polyphosphate composition dissolves relatively rapidly at room temperature in 0.1 wt. % citric acid, 0.005M EDTA and 0.01N HCl. In addition, the extent of dissolution in a one hour period in dilute acids such as 0.1 wt. % citric acid, 0.005M EDTA and 0.01N HCl at room temperature is a substantial fraction of the extent of dissolution in significantly stronger acids such as 0.1 N HCl acid at room temperature. For example, the combined amount of calcium and magnesium (and any chromium, cobalt, copper, iron, manganese, selenium and zinc) that dissolves from the inorganic polyphosphate composition during a 20 minute period in each of 0.1 wt. % citric acid, 0.005M EDTA and 0.01N HCl at room-temperature (25° C.) is at least 75% of the combined amount of calcium and magnesium (and any chromium, cobalt, copper, iron, manganese, selenium and zinc) that dissolves from the inorganic polyphosphate composition during a 20 minute period in 0.1N HCl at room-temperature (25° C.). In one preferred embodiment, the amount of such metals that dissolve in each of the dilute acids is at least 80% of the amount of such metals that dissolve in 0.1N HCl under such conditions. In one preferred embodiment, the amount of such metals that dissolve in each of the dilute acids is at least 85% of the amount of such metals that dissolve in 0.1 N HCl under such conditions. In one preferred embodiment, the amount of such metals that dissolve in each of the dilute acids is at least 90% of the amount of such metals that dissolve in 0.1N HCl under such conditions. In one preferred embodiment, the amount of such metals that dissolve in each of the dilute acids is at least 95% of the amount of such metals that dissolve in 0.1N HCl under such conditions.

Depending upon their composition, certain of the polyphosphates can be characterized by their X-ray diffraction reflections at one or more of the following positions: 5.96 (±0.03), 5.37 (±0.03), 5.01 (±0.025), 4.73, 4.61, 4.5, 4.15, 4.04, 3.7, 3.66(±0.01), 3.58(±0.01), 3.47(±0.01), 3.39(±0.01), 3.35(±0.01), 3.19(±0.01), 3.13(±0.01), 3.09(±0.01), 3.05(±0.01), 2.96(±0.009), 2.94(±0.009), 2.82 (±0.009), 2.76(±0.008), 2.73(±0.008), 2.59(±0.007), 2.53(±0.007), 2.5(±0.007), 2.43(±0.007), 2.41(±0.007), 2.37 (±0.007), 2.34(±0.006), 2.25(±0.006), 2.2(±0.006), 2.18(±0.005), 2.16(±0.005), 2.14(±0.005), 2.12(±0.005), 2.09(±0.005), 2.08(±0.005), 2.03(±0.005), 1.99(±0.004), 1.93(±0.004), 1.91(±0.004), 1.85(±0.003), 1.8(±0.003), 1.76 (±0.003), 1.72(±0.003), 1.68(±0.0028), 1.64(±0.0027), 1.59 (±0.0025), 1.57(±0.0024) Å.

Depending upon their composition, certain of the polyphosphates can be characterized by their X-ray diffraction reflections at one or more of the following positions: 7.54 (±0.03), 6.74(±0.03), 5.96 (±0.03), 5.37 (±0.03), 5.01 (±0.025), 4.73, 4.61, 4.5, 4.15, 4.04, 3.7, 3.66(±0.01), 3.58 (±0.01), 3.47(±0.01), 3.39(±0.01), 3.35(±0.01), 3.19(±0.01), 3.13(±0.01), 3.09(±0.01), 3.05(±0.01), 2.96(±0.009), 2.94(±0.009), 2.82(±0.009), 2.76(±0.008), 2.73(±0.008), 2.59(±0.007), 2.53(±0.007), 2.5(±0.007), 2.43(±0.007), 2.41 (±0.007), 2.37(±0.007), 2.34(±0.006), 2.25(±0.006), 2.2(±0.006), 2.18(±0.005), 2.16(±0.005), 2.14(±0.005), 2.12 (±0.005), 2.09(±0.005), 2.08(±0.005), 2.03(±0.005), 1.99(±0.004), 1.93(±0.004), 1.91(±0.004), 1.85(±0.003), 1.8 (±0.003), 1.76(±0.003), 1.72(±0.003), 1.68(±0.0028), 1.64 (±0.0027), 1.59(±0.0025), 1.57(±0.0024) Å.

Advantageously, the polyphosphate composition may comprise a range of metals and other ions in addition to calcium, magnesium, or a combination thereof. For example, the polyphosphate composition may comprise potassium as a nutrient ion. Typically in this embodiment, the polyphosphate composition preferably contains less than about 20 wt. % potassium, based on the total weight of the polyphosphate composition. In this embodiment, the polyphosphate composition preferably contains less than about 15 wt. % potassium, based on the total weight of the polyphosphate; in other such embodiments, the polyphosphate contains less than 10 wt. % potassium, less than 5 wt. % potassium, or even less than 1 wt. % potassium. When included, the polyphosphate will typically comprise about 10-15 wt. % potassium.

In one embodiment, the polyphosphate composition contains sodium (e.g., at least about 0.01 wt. % sodium) as a nutrient ion in addition to calcium, magnesium, or a combination thereof. In this embodiment, the polyphosphate composition preferably contains less than about 10 wt. % sodium, based on the total weight of the polyphosphate; in other such embodiments, the polyphosphate contains less than 7.5 wt. % sodium, less than 5 wt. % sodium, or even less than 1 wt. % sodium. When included, the polyphosphate will typically comprise about 1-5 wt. % sodium.

In one embodiment, the polyphosphate composition contains sulfur (e.g., at least about 0.01 wt. % sulfur) as a nutrient ion in addition to calcium, magnesium, or a combination thereof. In this embodiment, the polyphosphate composition preferably contains less than about 10 wt. % sulfur, based on the total weight of the polyphosphate; in other such embodiments, the polyphosphate contains less than 7 wt. % sulfur, less than 5 wt. % sulfur, or even less than 1 wt. % sulfur. When included, the polyphosphate will typically comprise about 1 to 7 wt. % sulfur.

In one embodiment, the polyphosphate composition contains ammonium (e.g., at least about 0.01 wt. % ammonium) as a nutrient ion in addition to calcium, magnesium, or a combination thereof. In this embodiment, the polyphosphate composition preferably contains less than about 10 wt. % ammonium, based on the total weight of the polyphosphate; in other such embodiments, the polyphosphate contains less than 7.5 wt. % ammonium, less than 5 wt. % ammonium, or even less than 1 wt. % ammonium. When included, the polyphosphate will typically comprise about 1-5 wt. % ammonium.

In one embodiment, the polyphosphate composition contains zinc (e.g., at least about 0.01 wt. % zinc) as a nutrient ion in addition to calcium, magnesium, or a combination thereof. In this embodiment, the polyphosphate composition preferably contains less than about 9 weight percent zinc, based on the total weight of the polyphosphate; in other such embodiments, the polyphosphate contains less than 6 wt. zinc, less than 5 wt. % zinc, less than 4 wt. % zinc, less than 3 wt. % zinc, less than 2 wt. % zinc, less than 1 wt. % zinc, less than 0.5 wt. % zinc, less than 0.25 wt. % zinc, or even less than 0.1 wt. % zinc.

In one embodiment, the polyphosphate composition contains iron (e.g., at least about 0.01 wt. % iron) as a nutrient ion in addition to calcium, magnesium, or a combination thereof. In this embodiment, the polyphosphate composition preferably contains less than about 6 weight percent iron, based on the total weight of the polyphosphate; in other such embodiments, the polyphosphate contains less than 5 wt. % iron, less than 4 wt. % iron, less than 3 wt. % iron, less than 2 wt. % iron, less than 1 wt. % iron, less than 0.5 wt. % iron, less than 0.25 wt. % iron, or even less than 0.1 wt. % iron.

In one embodiment, the polyphosphate composition contains manganese (e.g., at least about 0.01 wt. % manganese) as a nutrient ion in addition to calcium, magnesium, or a combination thereof. In this embodiment, the polyphosphate composition preferably contains less than about 5 weight percent manganese, based on the total weight of the polyphosphate; in other such embodiments, the polyphosphate contains less than 4 wt. % manganese, less than 3 wt. % manganese, less than 2 wt. % manganese, less than 1 wt. % manganese, less than 0.5 wt. % manganese, less than 0.25 wt. % manganese, or even less than 0.1 wt. % manganese.

In one embodiment, the polyphosphate composition contains copper (e.g., at least about 0.01 wt. % copper) as a nutrient ion in addition to calcium, magnesium, or a combination thereof. In this embodiment, the polyphosphate composition preferably contains less than about 12 weight percent copper, based on the total weight of the polyphosphate; in other such embodiments, the polyphosphate contains less than 5 wt. % copper, less than 4 wt. % copper, less than 3 wt. % copper, less than 2 wt. % copper, less than 1 wt. % copper, less than 0.5 wt. % copper, less than 0.25 wt. % copper, or even less than 0.1 wt. % copper.

In one embodiment, the polyphosphate composition contains chromium (e.g., at least about 0.01 wt. % chromium) as a nutrient ion in addition to calcium, magnesium, or a combination thereof. In this embodiment, the polyphosphate composition preferably contains less than about 5 weight percent chromium, based on the total weight of the polyphosphate; in other such embodiments, the polyphosphate contains less than 4 wt. % chromium, less than 3 wt. % chromium, less than 2 wt. % chromium, less than 1 wt. % chromium, less than 0.5 wt. % chromium, less than 0.25 wt. % chromium, or even less than 0.1 wt. % chromium.

In one embodiment, the polyphosphate composition contains cobalt (e.g., at least about 0.01 wt. % cobalt) as a nutrient ion in addition to calcium, magnesium, or a combination thereof. In this embodiment, the polyphosphate composition preferably contains less than about 5 weight percent cobalt, based on the total weight of the polyphosphate; in other such embodiments, the polyphosphate contains less than 4 wt. % cobalt, less than 3 wt. % cobalt, less than 2 wt. % cobalt, less than 1 wt. % cobalt, less than 0.9 wt. % cobalt, less than 0.75 wt. % cobalt, less than 0.5 wt. % cobalt, less than 0.25 wt. % cobalt, less than 0.1 wt. % cobalt, or even less than 0.05 wt. % cobalt.

In one embodiment, the polyphosphate composition contains selenium (e.g., at least about 0.01 wt. % selenium) as a nutrient ion in addition to calcium, magnesium, or a combination thereof. In this embodiment, the polyphosphate composition preferably contains less than about 10 weight percent selenium, based on the total weight of the polyphosphate; in other such embodiments, the polyphosphate contains less than 5 wt. % selenium, less than 3 wt. % selenium, less than 1 wt. % selenium, less than 0.5 wt. % selenium, less than 0.5 wt. % selenium, less than 0.9 wt. °A) selenium, less than 0.75 wt. % selenium, less than 0.5 wt. % selenium, less than 0.25 wt. % selenium, less than 0.1 wt. % selenium, or even less than 0.05 wt. % selenium.

In one embodiment, the polyphosphate composition contains boron (e.g., at least about 0.01 wt. % boron) as a nutrient ion in addition to calcium, magnesium, or a combination thereof. In this embodiment, the polyphosphate composition preferably contains less than about 10 weight percent boron, based on the total weight of the polyphosphate; in other such embodiments, the polyphosphate contains less than 5 wt. % boron, less than 2 wt. % boron, less than 1.75 wt. % boron, less than 1.5 wt. % boron, less than 1.25 wt. % boron, less than 1 wt. % boron, less than 0.75 wt. % boron, less than 0.5 wt. % boron, less than 0.25 wt. % boron, less than 0.1 wt. % boron, less than 0.075 wt. % boron, less than 0.05 wt. % boron, less than 0.025 wt. % boron, or even about 0.01 wt. % boron.

In one embodiment, the polyphosphate composition contains iodine (e.g., at least about 0.01 wt. % iodine) as a nutrient ion in addition to calcium, magnesium, or a combination thereof.

In one embodiment, the polyphosphate composition contains molybdenum (e.g., at least about 0.01 wt. % molybdenum) as a nutrient ion in addition to calcium, magnesium, or a combination thereof. In this embodiment, the polyphosphate composition preferably contains less than about 10 weight percent molybdenum, based on the total weight of the polyphosphate; in other such embodiments, the polyphosphate contains less than 5 wt. % molybdenum, less than 3 wt. % molybdenum, less than 2 wt. % molybdenum, less than 1 wt. % molybdenum, less than 0.09 wt. % molybdenum, less than 0.075 wt. % molybdenum, less than 0.05 wt. % molybdenum, less than 0.025 wt. % molybdenum, or even about 0.01 wt. % molybdenum.

In one embodiment, the polyphosphate composition contains at least 0.01 wt. % of at least each of two different nutrients selected from the group consisting of boron, chromium, cobalt, copper, iodine, iron, manganese, molybdenum, selenium and zinc. In this embodiment, the polyphosphate composition contains less than about 15 weight percent of such nutrients, combined, based on the total weight of the polyphosphate composition. For example, in one such embodiment, the polyphosphate composition contains less than about 10 weight percent of such nutrients, combined, based on the total weight of the polyphosphate composition. By way of further example, in one such embodiment, the polyphosphate composition contains less than about 7 weight percent of such nutrients, combined, based on the total weight of the polyphosphate composition. By way of further example, in one such embodiment, the polyphosphate composition contains less than about 6 weight percent of such nutrients, combined, based on the total weight of the polyphosphate composition. By way of further example, in one such embodiment, the polyphosphate composition contains less than about 5 weight percent of such nutrients, combined, based on the total weight of the polyphosphate composition. By way of further example, in one such embodiment, the polyphosphate composition contains less than about 4.5 weight percent of such nutrients, combined, based on the total weight of the polyphosphate composition. By way of further example, in one such embodiment, the polyphosphate composition contains less than about 4 weight percent of such nutrients, combined, based on the total weight of the polyphosphate composition. By way of further example, in one such embodiment, the polyphosphate composition contains less than about 3.5 weight percent of such nutrients, combined, based on the total weight of the polyphosphate composition. By way of further example, in one such embodiment, the polyphosphate composition contains less than about 3 weight percent of such nutrients, combined, based on the total weight of the polyphosphate composition. By way of further example, in one such embodiment, the polyphosphate composition contains less than about 2.5 weight percent of such nutrients, combined, based on the total weight of the polyphosphate composition. By way of further example, in one such embodiment, the polyphosphate composition contains less than about 2 weight percent of such nutrients, combined, based on the total weight of the polyphosphate composition. By way of further example, in one such embodiment, the polyphosphate composition contains less than about 1.5 weight percent of such nutrients, combined, based on the total weight of the polyphosphate composition. By way of further example, in one such embodiment, the polyphosphate composition contains less than about 1 weight percent of such nutrients, combined, based on the total weight of the polyphosphate composition. By way of further example, in one such embodiment, the polyphosphate composition contains less than about 0.5 weight percent of such nutrients, combined, based on the total weight of the polyphosphate composition.

For use as a fertilizer, the polyphosphate compositions of the present invention may optionally contain, in addition to one or more of ammonium, boron, chromium, cobalt, copper, iodine, iron, manganese, molybdenum, potassium, selenium, sodium, sulfur and zinc, other components that contribute to the nutritional, material handling, or other characteristics of the fertilizer. For example, the fertilizer composition may contain a water-soluble N—P—K macronutrient fertilizer composition that has been blended or otherwise combined with the alkaline earth metal polyphosphate composition. By way of further example, the fertilizer may contain organic materials like plant residues that have been blended or otherwise combined with the micronutrient metal polyphosphate composition to improve the material handling characteristics of the fertilizer.

In general, the alkaline earth metal polyphosphate is preferably a solid, free-flowing particulate material. Particle size is not narrowly critical but is generally preferably less than 80 mesh BS. Stated differently, a mass of the particulate polyphosphate composition has a size distribution with substantially all of the particles having a size less than 80 mesh BS. In one embodiment, a significant fraction of the particles have a size less than 150 mesh BS. For example, in one embodiment the majority of the particles in a population of particles are less than 150 mesh BS. By way of further example, in one embodiment a significant fraction of the particles may be smaller than 300 mesh BS; in one such embodiment, the particles have a size distribution with about 20% by volume of the particles having a size less than 300 mesh BS.

In general, the polyphosphate composition is preferably a solid, free-flowing particulate material with relatively low moisture content. Typically, the polyphosphate composition comprises less than 20 wt. % moisture. For example, in certain embodiments, the polyphosphate composition comprises less than 10 wt. % moisture. In certain embodiments, the polyphosphate composition comprises less than 8 wt. % moisture. By way of further example, in certain embodiments the polyphosphate composition comprises less than 5 wt. % moisture. For example, in certain embodiments, the polyphosphate composition comprises at least 2 wt. % moisture. By way of further example, in certain embodiments the polyphosphate composition comprises less than 4 wt. % moisture Alkaline Earth Metal Polyphosphates In another embodiment, the polyphosphate composition comprises calcium as the only cation (other than protons). In such embodiments, the ratio of the combined number of moles of phosphorus, sulfur, boron, molybdenum, selenium (incorporated in the phosphate, sulfate, borate, molybdate and selenate repeat units) to moles of calcium in the calcium polyphosphate may be greater than 0.5:1, respectively.

By way of further example, the ratio of the moles of phosphorus, sulfur, boron, molybdenum, selenium (incorporated in the phosphate, sulfate, borate, molybdate and selenate repeat units) to moles of calcium in the calcium polyphosphate may be greater than 0.66:1, respectively. By way of further example, the ratio of the moles of phosphorus, sulfur, boron, molybdenum, selenium (incorporated in the phosphate, sulfate, borate, molybdate and selenate repeat units) to moles of calcium in the calcium polyphosphate may be greater than 1.1:1, respectively. By way of further example, the ratio of the moles of phosphorus, sulfur, boron, molybdenum, selenium (incorporated in the phosphate, sulfate, borate, molybdate and selenate repeat units) to moles of calcium in the calcium polyphosphate may be greater than 1.67:1, respectively.

In certain embodiments, the ratio of the moles of phosphorus to moles of calcium in the calcium polyphosphate may be greater than 0.5:1, respectively. By way of further example, the ratio of the moles of phosphorus to moles of calcium in the calcium polyphosphate may be greater than 0.66:1, respectively. By way of further example, the ratio of the moles of phosphorus to moles of calcium in the calcium polyphosphate may be greater than 1.1:1, respectively. By way of further example, the ratio of the moles of phosphorus to moles of calcium in the calcium polyphosphate may be greater than 1.67:1, respectively.

In another embodiment, the polyphosphate composition comprises magnesium as the only cation (other than protons). In such embodiments, the ratio of the combined number of moles of phosphorus, sulfur, boron, molybdenum, selenium (incorporated in the phosphate, sulfate, borate, molybdate and selenate repeat units) to moles of magnesium in the magnesium polyphosphate may be greater than 0.5:1, respectively. By way of further example, the ratio of the moles of phosphorus, sulfur, boron, molybdenum, selenium (incorporated in the phosphate, sulfate, borate, molybdate and selenate repeat units) to moles of magnesium in the magnesium polyphosphate may be greater than 0.66:1, respectively. By way of further example, the ratio of the moles of phosphorus, sulfur, boron, molybdenum, selenium (incorporated in the phosphate, sulfate, borate, molybdate and selenate repeat units) to moles of magnesium in the magnesium polyphosphate may be greater than 1.1:1, respectively. By way of further example, the ratio of the moles of phosphorus, sulfur, boron, molybdenum, selenium (incorporated in the phosphate, sulfate, borate, molybdate and selenate repeat units) to moles of magnesium in the magnesium polyphosphate may be greater than 1.67:1, respectively.

In some embodiments, the ratio of the moles of phosphorus to moles of magnesium in the magnesium polyphosphate may be greater than 0.5:1, respectively. By way of further example, the ratio of the moles of phosphorus to moles of magnesium in the magnesium polyphosphate may be greater than 0.66:1, respectively. By way of further example, the ratio of the moles of phosphorus to moles of magnesium in the magnesium polyphosphate may be greater than 1.1:1, respectively. By way of further example, the ratio of the moles of phosphorus to moles of magnesium in the magnesium polyphosphate may be greater than 1.67:1, respectively.

In another embodiment, the polyphosphate composition comprises calcium and magnesium as the only cations (other than protons). For example, the ratio of moles of calcium to moles of magnesium may be greater than 0.2:1, respectively. By way of further example, the ratio of the moles of calcium to moles of magnesium may be greater than 0.5:1, respectively. By way of further example, the ratio of the moles of calcium to moles of magnesium may be greater than 1:1, respectively. By way of further example, the ratio of the moles of calcium to moles of magnesium may be greater than 2:1, respectively. By way of further example, the ratio of moles of calcium to moles of magnesium may be greater than 4:1, respectively. By way of further example, the ratio of the moles of calcium to moles of magnesium may be greater than 5:1, respectively. By way of further example, the ratio of the combined number of moles of phosphorus, sulfur, boron, molybdenum, and selenium (incorporated in the phosphate, sulfate, borate, molybdate and selenate repeat units) to moles of calcium and magnesium (in combination) in the polyphosphate may be greater than 0.67:1, respectively. By way of further example, the ratio of the combined number of moles of phosphorus, sulfur, boron, molybdenum, and selenium (incorporated in the phosphate, sulfate, borate, molybdate and selenate repeat units) to moles of calcium and magnesium (in combination) in the polyphosphate may be greater than 0.74:1, respectively. By way of further example, the ratio of the combined number of moles of phosphorus, sulfur, boron, molybdenum, and selenium (incorporated in the phosphate, sulfate, borate, molybdate and selenate repeat units) to moles of calcium and magnesium (in combination) in the polyphosphate may be greater than 0.83:1, respectively. By way of further example, the ratio of the combined number of moles of phosphorus, sulfur, boron, molybdenum, and selenium (incorporated in the phosphate, sulfate, borate, molybdate and selenate repeat units) to moles of calcium and magnesium (in combination) in the polyphosphate may be greater than 0.95:1, respectively. By way of further example, the ratio of the combined number of moles of phosphorus, sulfur, boron, molybdenum, and selenium (incorporated in the phosphate, sulfate, borate, molybdate and selenate repeat units) to moles of calcium and magnesium (in combination) in the polyphosphate may be greater than 1.1:1, respectively. By way of further example, the ratio of the combined number of moles of phosphorus, sulfur, boron, molybdenum, and selenium (incorporated in the phosphate, sulfate, borate, molybdate and selenate repeat units) to moles of calcium and magnesium (in combination) in the polyphosphate may be greater than 1.33:1, respectively. By way of further example, the ratio of the combined number of moles of phosphorus, sulfur, boron, molybdenum, and selenium (incorporated in the phosphate, sulfate, borate, molybdate and selenate repeat units) to moles of calcium and magnesium (in combination) in the polyphosphate may be equal to 1.67.1, respectively.

In certain embodiments, the ratio of the moles of phosphorus to moles of calcium and magnesium (in combination) in the polyphosphate may be greater than 0.5:1, respectively. By way of further example, the ratio of the moles of phosphorus to moles of calcium and magnesium (in combination) in the polyphosphate may be greater than 0.67:1, respectively. By way of further example, the ratio of the moles of phosphorus to moles of calcium and magnesium (in combination) in the polyphosphate may be greater than 0.74:1, respectively. By way of further example, the ratio of the moles of phosphorus to moles of calcium and magnesium (in combination) in the polyphosphate may be greater than 0.83:1, respectively. By way of further example, the ratio of the moles of phosphorus to moles of calcium and magnesium (in combination) in the polyphosphate may be greater than 0.95:1, respectively. By way of further example, the ratio of the moles of phosphorus to moles of calcium and magnesium (in combination) in the polyphosphate may be greater than 1.1:1, respectively. By way of further example, the ratio of the moles of phosphorus to moles of calcium and magnesium (in combination) in the polyphosphate may be greater than 1.33:1, respectively. By way of further example, the ratio of the moles of phosphorus to moles of calcium and magnesium (in combination) in the polyphosphate may be equal to 1.67.1, respectively.

In one embodiment, the polyphosphate composition comprises calcium, magnesium and one nutrient ion as the only cations (other than protons). For example, alkaline earth metal polyphosphate composition may comprise only calcium and magnesium and zinc as the only cations (other than protons). By way of further example, the ratio of the combined number of moles of phosphorus, sulfur, boron, molybdenum and selenium incorporated in the repeat units to moles of zinc in the polyphosphate may be greater than 5:1, respectively. By way of further example, the ratio of the moles of phosphorus to moles of zinc in the polyphosphate may be greater than 5:1, respectively. By way of further example, the ratio of the combined number of moles of phosphorus, sulfur, boron, molybdenum and selenium incorporated in the repeat units to moles of zinc in the polyphosphate may be greater than 10:1, respectively. By way of further example, the ratio of the moles of phosphorus to moles of zinc in the polyphosphate may be greater than 10:1, respectively. By way of further example, the ratio of the combined number of moles of phosphorus, sulfur, boron, molybdenum and selenium incorporated in the repeat units to moles of zinc in the polyphosphate may be greater than 20:1, respectively. By way of further example, the ratio of the moles of phosphorus to moles of zinc in the polyphosphate may be greater than 20:1, respectively.

In one embodiment, the polyphosphate composition comprises calcium, magnesium and one nutrient ion as the only cations (other than protons). For example, the polyphosphate composition may comprise only calcium, magnesium and iron as the only cations (other than protons). By way of further example, the ratio of the combined number of moles of phosphorus, sulfur, boron, molybdenum and selenium incorporated in the repeat units to moles of iron in the polyphosphate may be greater than 5:1, respectively. By way of further example, the ratio of the moles of phosphorus to moles of iron in the polyphosphate may be greater than 5:1, respectively. By way of further example, the ratio of the combined number of moles of phosphorus, sulfur, boron, molybdenum and selenium incorporated in the repeat units to moles of iron in the polyphosphate may be greater than 10:1, respectively. By way of further example, the ratio of the moles of phosphorus to moles of iron in the polyphosphate may be greater than 10:1, respectively. By way of further example, the ratio of the combined number of moles of phosphorus, sulfur, boron, molybdenum and selenium incorporated in the repeat units to moles of iron in the polyphosphate may be greater than 20:1, respectively. By way of further example, the ratio of the moles of phosphorus to moles of iron in the polyphosphate may be greater than 20:1, respectively.

In one embodiment, the polyphosphate composition comprises calcium, magnesium and one nutrient ion as the only cations (other than protons). For example, polyphosphate composition may comprise only calcium and magnesium and manganese as the only cations (other than protons). By way of further example, the ratio of the combined number of moles of phosphorus, sulfur, boron, molybdenum and selenium incorporated in the repeat units to moles of manganese in the polyphosphate may be greater than 5:1, respectively. By way of further example, the ratio of the moles of phosphorus to moles of manganese to in the polyphosphate may be greater than 5:1, respectively. By way of further example, the ratio of the combined number of moles of phosphorus, sulfur, boron, molybdenum and selenium incorporated in the repeat units to moles of manganese in the polyphosphate may be greater than 10:1, respectively. By way of further example, the ratio of the moles of phosphorus to moles of manganese to in the polyphosphate may be greater than 10:1, respectively. By way of further example, the ratio of the combined number of moles of phosphorus, sulfur, boron, molybdenum and selenium incorporated in the repeat units to moles of manganese in the polyphosphate may be greater than 20:1, respectively. By way of further example, the ratio of the moles of phosphorus to moles of manganese in the polyphosphate may be greater than 20:1, respectively.

In one embodiment, the alkaline earth metal polyphosphate composition comprises calcium, magnesium and one nutrient ion as the only cations (other than protons). For example, alkaline earth metal polyphosphate composition may comprise calcium, magnesium and boron as the only cations (other than protons). By way of further example, the ratio of the moles of phosphorus to moles of boron to in the polyphosphate may be greater than 2:1, respectively. By way of further example, the ratio of the moles of phosphorus to moles of boron to in the polyphosphate may be greater than 5:1, respectively. By way of further example, the ratio of the moles of phosphorus to moles of boron to in the polyphosphate may be greater than 10:1, respectively. By way of further example, the ratio of the moles of phosphorus to moles of boron in the polyphosphate may be greater than 20:1, respectively.

In one embodiment, the alkaline earth metal polyphosphate composition comprises calcium, magnesium and one nutrient ion as the only cations (other than protons). For example, alkaline earth metal polyphosphate composition may comprise calcium, magnesium and copper as the only cations (other than protons). By way of further example, the ratio of the combined number of moles of phosphorus, sulfur, boron, molybdenum and selenium incorporated in the repeat units to moles of copper in the polyphosphate may be greater than 5:1, respectively. By way of further example, the ratio of the moles of phosphorus to moles of copper in the polyphosphate may be greater than 5:1, respectively. By way of further example, the ratio of the combined number of moles of phosphorus, sulfur, boron, molybdenum and selenium incorporated in the repeat units to moles of copper in the polyphosphate may be greater than 10:1, respectively. By way of further example, the ratio of the moles of phosphorus to moles of copper in the polyphosphate may be greater than 10:1, respectively. By way of further example, the ratio of the combined number of moles of phosphorus, sulfur, boron, molybdenum and selenium incorporated in the repeat units to moles of copper in the polyphosphate may be greater than 20:1, respectively. By way of further example, the ratio of the moles of phosphorus to moles of copper in the polyphosphate may be greater than 20:1, respectively.

In one embodiment, the alkaline earth metal polyphosphate composition comprises calcium, magnesium, and one nutrient ion as the only cations (other than protons). For example, alkaline earth metal polyphosphate composition may comprise calcium, magnesium and selenium as the only cations (other than protons). By way of further example, the ratio of the moles of phosphorus to moles of selenium in the polyphosphate may be greater than 2:1, respectively. By way of further example, the ratio of the moles of phosphorus to moles of selenium in the polyphosphate may be greater than 5:1, respectively. By way of further example, the ratio of the moles of phosphorus to moles of selenium in the polyphosphate may be greater than 10:1, respectively. By way of further example, the ratio of the moles of phosphorus to moles of selenium in the polyphosphate may be greater than 20:1, respectively.

More generally, in certain embodiments the ratio of the moles of phosphorus to moles of nutrient ions (selected from among boron, chromium, cobalt, copper, iodine, iron, manganese, molybdenum, selenium, sulfur and zinc) will be greater than 2:1, respectively. For example, in one embodiment in which the polyphosphate comprises two or more nutrient ions (selected from among boron, chromium, cobalt, copper, iodine, iron, manganese, molybdenum, selenium and zinc), the ratio of the moles of phosphorus to moles of the nutrient ions will be greater than 5:1, respectively. For example, in one embodiment in which the polyphosphate comprises two or more nutrient ions (selected from among boron, chromium, cobalt, copper, iodine, iron, manganese, molybdenum, selenium and zinc), the ratio of the moles of phosphorus to moles of the nutrient ions will be greater than 10:1, respectively. For example, in one embodiment in which the polyphosphate comprises two or more nutrient ions (selected from among boron, chromium, cobalt, copper, iodine, iron, manganese, molybdenum, selenium, sulfur and zinc), the ratio of the moles of phosphorus to moles of the nutrient ions will be greater than 20:1, respectively.

As described elsewhere herein, the polyphosphate compositions may be neutralized post-polymerization for improved material handling characteristics. In general, it is preferred that the equilibrium pH of an aqueous mixture of ten parts by weight of water at neutral pH and one part by weight of the neutralized polyphosphate be at least pH 2. More preferably, the equilibrium pH of an aqueous mixture of ten parts by weight of water at neutral pH and one part by weight of the neutralized polyphosphate be at least pH 3. Still more preferably, the equilibrium pH of an aqueous mixture of ten parts by weight of water at neutral pH and one part by weight of the neutralized polyphosphate be at least pH 4. Still more preferably, the equilibrium pH of an aqueous mixture of ten parts by weight of water at neutral pH and one part by weight of the neutralized polyphosphate be at least pH 5. In certain embodiments, the equilibrium pH of an aqueous mixture of ten parts by weight of water at neutral pH and one part by weight of the neutralized polyphosphate be at least pH 6. For example, in one embodiment, the equilibrium pH of an aqueous mixture of ten parts by weight of water at neutral pH and one part by weight of the neutralized polyphosphate will be in the range of pH 4-8.

Calcium Polyphosphate Compositions

In one embodiment, the polyphosphate composition of the present invention comprises calcium as a cation. In general, polyphosphate compositions containing calcium as a cation contain at least 7 wt. % calcium. Typically, polyphosphate compositions containing calcium as a cation contain at least 10 wt. % calcium. In certain embodiments, polyphosphate compositions containing calcium as a cation contain at least 13 wt. % calcium. In certain embodiments, polyphosphate compositions containing calcium as a cation contain at least 15 wt. % calcium. In other embodiments, polyphosphate compositions containing calcium as a cation contain at least 20 wt. % calcium. In other embodiments, polyphosphate compositions containing calcium as a cation contain at least 25 wt. % calcium. For example, in one embodiment, the polyphosphate compositions containing calcium as a cation contain 7-25 wt. % calcium. By way of further example, in one embodiment, the polyphosphate compositions containing calcium as a cation contain 7-35 wt. % calcium. In each of these embodiments, the calcium polyphosphate may optionally contain magnesium and one or more of the other nutrient ions described herein, or yet other compositions that may contribute to the nutritional, material or handling characteristics of the polyphosphate composition as a fertilizer.

Calcium polyphosphate fertilizers compositions of the present invention may optionally contain other components that contribute to the nutritional, material handling, or other characteristics of the fertilizer. For example, the calcium micronutrient fertilizer may contain a water-soluble N—P—K macronutrient fertilizer that has been blended or otherwise combined with the calcium polyphosphate composition. By way of further example, the calcium polyphosphate fertilizer may contain water-soluble or even water-insoluble nutrient compounds that has been blended or otherwise combined with the calcium polyphosphate composition. By way of further example, the calcium polyphosphate fertilizer may contain organic materials like plant residues that have been blended or otherwise combined with the calcium polyphosphate composition to improve the material handling characteristics of calcium polyphosphate fertilizer.

Calcium polyphosphate compositions may be prepared by combining a calcium source material, phosphoric acid and, optionally, one or more additional materials to form a reaction mixture and reacting the components of the mixture to form the calcium polyphosphate. The polyphosphate is neutralized with calcium oxide or carbonate. The optional additional materials include, for example, magnesium and one or more of the other nutrient ions described herein. The calcium source material may be any source of calcium that is compatible with the polymerization process of the present invention. Such sources include, for example, calcium oxide, calcium carbonate, limestone, rock phosphate (apatite), calcium sulfate and calcium chloride.

Magnesium Polyphosphate Compositions

In one embodiment, the polyphosphate composition of the present invention comprises magnesium as a cation. In general, polyphosphate compositions containing magnesium as a cation contain at least 7 wt. % magnesium. Typically, polyphosphate compositions containing magnesium as a cation contain at least 10 wt. % magnesium. In certain embodiments, polyphosphate compositions containing magnesium as a cation contain at least 13 wt. % magnesium. In certain embodiments, polyphosphate compositions containing magnesium as a cation contain at least 15 wt. % magnesium. In other embodiments, polyphosphate compositions containing magnesium as a cation contain at least 20 wt. % magnesium. In other embodiments, polyphosphate compositions containing magnesium as a cation contain at least 25 wt. % magnesium. In each of these embodiments, the magnesium polyphosphate may optionally contain calcium and one or more of the other nutrient ions described herein, or yet other compositions that may contribute to the nutritional, material or handling characteristics of the polyphosphate composition as a fertilizer.

Magnesium polyphosphate fertilizers of the present invention may optionally contain other components that contribute to the nutritional, material handling, or other characteristics of the polyphosphate composition. For example, the magnesium micronutrient composition may contain a water-soluble N—P—K macronutrient fertilizer that has been blended or otherwise combined with the magnesium polyphosphate composition. By way of further example, the magnesium polyphosphate composition may contain water-soluble or even water-insoluble nutrient compounds that has been blended or otherwise combined with the magnesium polyphosphate composition. By way of further example, the magnesium polyphosphate composition may contain organic materials like plant residues that have been blended or otherwise combined with the magnesium polyphosphate composition to improve the material handling characteristics of the composition.

Magnesium polyphosphate compositions may be prepared by combining a magnesium source material, phosphoric acid and, optionally, one or more additional materials to form a reaction mixture and reacting the components of the mixture to form the magnesium polyphosphate. The magnesium polyphosphate is neutralized with a basic magnesium source that may include magnesium oxide and magnesium carbonate. The optional additional materials include, for example, calcium and one or more of the other nutrient ions described herein. The magnesium source material may be any source of magnesium that is compatible with the polymerization process of the present invention. Such sources include, for example, magnesium oxide, magnesium carbonate, magnesite, magnesium sulfate, and magnesium chloride.

Polyphosphate Fertilizers Containing Two Alkaline Earth Metal Ions

As noted, the polyphosphate may contain one or more alkaline earth metal and one or more nutrient ions. In general fertilizers that contain two alkaline earth metals contain at least 7 wt. % alkaline earth metals, more typically at least 10 wt. % of alkaline earth metals. Additionally, the alkaline earth metals may be present in any of the concentrations recited herein in connection with the calcium polyphosphate fertilizers and magnesium polyphosphate fertilizers. For example, the fertilizer may contain 7-35 wt. % calcium and/or 7-35 wt. % magnesium. By way of further example, the fertilizer may contain 7-25 wt. % calcium and/or 7-25 wt. % magnesium. In addition, the fertilizer may optionally comprise one or more of the nutrient ions such as one or more of potassium, ammonium, sodium, zinc, iron, manganese, copper, boron, molybdenum, selenium, sulfur, iodine and cobalt.

For certain applications, it is preferred that the alkaline earth metal polyphosphate contains a combination of nutrient ions. In one such embodiment, the alkaline earth metals polyphosphate contains potassium as nutrient ion. For example, in one such embodiment, the potassium constitutes at least 0.01 wt. % of the alkaline earth metals polyphosphate composition. By way of further example, in one such embodiment, the potassium constitutes at least 2 wt. % of the alkaline earth metals polyphosphate composition. By way of further example, in one such embodiment, the potassium constitutes at least 10 wt. % of the alkaline earth metals polyphosphate composition. By way of further example, in one such embodiment, the potassium constitutes at least 20 wt. % of the alkaline earth metals polyphosphate composition.

For other applications it is preferred that the micronutrient metal polyphosphate contain ammonium as nutrient ion. For example, in one such embodiment, the ammonium constitutes at least 0.01 wt. % of the alkaline earth metal polyphosphate composition. By way of further example, in one such embodiment, the ammonium constitutes at least 4 wt. % of the alkaline earth metal polyphosphate composition. By way of further example, in one such embodiment, the ammonium constitutes at least 10 wt. % of the alkaline earth metal polyphosphate composition. By way of further example, in one such embodiment, the ammonium constitutes 4-15 wt. % of the alkaline earth metal polyphosphate composition.

For other applications it is preferred that the alkaline earth metal polyphosphate contains zinc as nutrient ion. For example, in one such embodiment, the zinc constitutes at least 0.01 wt. % of the alkaline earth metal polyphosphate composition. By way of further example, in one such embodiment, the zinc constitutes less than 9 wt. % of the alkaline earth metal polyphosphate composition. By way of further example, in one such embodiment, the zinc constitutes less than 5 wt. % of the alkaline earth metal polyphosphate composition. By way of further example, in one such embodiment, the zinc constitutes less than 2 wt. % of the alkaline earth metal polyphosphate composition.

For other applications it is preferred that the alkaline earth metal polyphosphate contains iron as nutrient ion. For example, in one such embodiment, the iron constitutes at least 0.01 wt. % of the alkaline earth metal polyphosphate composition. By way of further example, in one such embodiment, the iron constitutes less than 6 wt. % of the alkaline earth metal polyphosphate composition. By way of further example, in one such embodiment, the iron constitutes less than 3 wt. % of the alkaline earth metal polyphosphate composition. By way of further example, in one such embodiment, the iron constitutes less than 1 wt. % of the alkaline earth metal polyphosphate composition.

For other applications it is preferred that the alkaline earth metal polyphosphate contains manganese as nutrient ion. For example, in one such embodiment, the manganese constitutes at least 0.01 wt. % of the alkaline earth metal polyphosphate composition. By way of further example, in one such embodiment, the manganese constitutes less than 5 wt. % of the alkaline earth metal polyphosphate composition. By way of further example, in one such embodiment, the manganese constitutes less than 2 wt. % of the alkaline earth metal polyphosphate composition. By way of further example, in one such embodiment, the manganese constitutes less than 1 wt. % of the alkaline earth metal polyphosphate composition.

For other applications it is preferred that the alkaline earth metal polyphosphate contains copper as nutrient ion. For example, in one such embodiment, the copper constitutes at least 0.01 wt. % of the alkaline earth metal polyphosphate composition. By way of further example, in one such embodiment, the copper constitutes less than 5 wt. % of the alkaline earth metal polyphosphate composition. By way of further example, in one such embodiment, the copper constitutes less than 2 wt. % of the alkaline earth metal polyphosphate composition. By way of further example, in one such embodiment, the copper constitutes less than 1 wt. % of the alkaline earth metal polyphosphate composition.

For other applications it is preferred that the alkaline earth metal polyphosphate contains boron as nutrient ion. For example, in one such embodiment, the boron constitutes at least 0.01 wt. % of the alkaline earth metal polyphosphate composition. By way of further example, in one such embodiment, the boron constitutes less than 5 wt. % of the alkaline earth metal polyphosphate composition. By way of further example, in one such embodiment, the boron constitutes less than 2 wt. % of the alkaline earth metal polyphosphate composition. By way of further example, in one such embodiment, the boron constitutes less than 1 wt. % of the alkaline earth metal polyphosphate composition.

For other applications it is preferred that the alkaline earth metal polyphosphate contains selenium as nutrient ion. For example, in one such embodiment, the selenium constitutes at least 0.01 wt. % of the alkaline earth metal polyphosphate composition. By way of further example, in one such embodiment, the selenium constitutes less than 5 wt. % of the alkaline earth metal polyphosphate composition. By way of further example, in one such embodiment, the selenium constitutes less than 2 wt. % of the alkaline earth metal polyphosphate composition. By way of further example, in one such embodiment, the selenium constitutes less than 1 wt. % of the alkaline earth metal polyphosphate composition For other applications it is preferred that the alkaline earth metal polyphosphate contain one or more of the nutrient ions disclosed herein. For example, in one embodiment the alkaline earth metal polyphosphate may contain less than 5 wt. % zinc and less than 2 wt. % boron. By way of further example, in one embodiment the micronutrient metal polyphosphate may contain less than 3 wt. % zinc and less than 2 wt. % boron. By way of further example, in one embodiment the micronutrient metal polyphosphate may contain less than 2 wt. % zinc and less than 0.2 wt. % boron.

For other applications it is preferred that the alkaline earth metal polyphosphate contain potassium, zinc, iron and manganese as nutrients. For example, in one such embodiment, the potassium, zinc, iron and manganese, in combination, constitute less than 20 wt. % of the alkaline earth metal polyphosphate composition. By way of further example, in one such embodiment, the potassium, zinc, iron and manganese, in combination, constitute less than 10 wt. % of the alkaline earth metal polyphosphate composition. By way of further example, in one such embodiment, the potassium, zinc, iron and manganese, in combination, constitute less than 5 wt. % of the alkaline earth metal polyphosphate composition.

Methods of Producing Polyphosphate Compositions

In an illustrative embodiment, the polyphosphate compositions are produced by heating alkaline earth metal containing compounds such as oxides, carbonates, hydroxides, phosphates, sulfates or combinations thereof, with phosphoric acid, and optionally nutrient compounds and optionally water. In an embodiment, heating alkaline earth metal containing compounds such as metal oxides, metal carbonates, or combinations thereof, with phosphoric acid, and optionally water, produces polyphosphates. In an alternative embodiment, the polyphosphate compositions are produced by preheating phosphoric acid and optionally water to between about 60° C. and 140° C., or to between 60° C. and 200° C. and then combining alkaline earth metal containing compounds such as oxides, carbonates, hydroxides or combinations thereof and optionally nutrient compounds. In another alternative embodiment, the polyphosphate compositions are produced by heating alkaline earth metal containing compounds such as oxides, carbonates, hydroxides or combinations thereof, with phosphoric acid, and optionally water then adding optionally nutrient compounds and continuing the heating. In an embodiment, the polymerization step does not include a condensing agent such as urea. In an embodiment the heating is not continued till the stage when the polyphosphate becomes solid. In this embodiment, heating is done only till the stage that the polyphosphate remains a liquid.

After the alkaline earth metal compound is added to the phosphoric acid and optionally water, and optionally sulfuric acid, boric acid, borax, molybdic acid or selenic acid or a salt thereof, the mixture may be heated to between about 70° C. and about 160° C., alternatively between about 80° C. and about 120° C., alternatively between about 80° C. and about 200° C., alternatively to about 105° C., alternatively to about 110° C. Then, the nutrient ion compound and optionally sulfuric acid, boric acid, borax, molybdic acid or selenic acid or a salt thereof may be added to the mixture of alkaline earth metal compound and phosphoric acid. Contemporaneously with the addition of nutrient ion compound, water is preferably added to the mixture. The mixture of the alkaline earth metal compound, phosphoric acid, optionally nutrient ion compound, and water is preferably heated to between about 70° C. and about 160° C., alternatively between about 80° C. and about 120° C., alternatively between about 80° C. and about 200° C., alternatively to about 105° C., alternatively to about 110° C., and polymerization occurs.

Preferably, during the polymerization stage, for any alkaline earth metal ion $M^{2+}$, the molar ratio of phosphorous to metal is greater than about 1.5:1. Thus, for producing a calcium polyphosphate, the molar ratio of phosphorous to calcium taken for polymerization is more than 2:1, preferably about 2.2:1, or preferably about 2.5:1, or preferably about 3:1. Alternately, for producing a calcium-magnesium polyphosphate, the molar ratio of phosphorous to calcium and magnesium (in combination), taken for polymerization is more than 2:1, preferably about 2.7:1. Alternately, for producing a calcium-magnesium polyphosphate, the molar ratio of phosphorous to calcium and magnesium (in combination), taken for polymerization is more than 2:1, preferably about 3:1

In an alternative embodiment, for any optional nutrient metal ion $M^{n+}$, where n+ is the valance of the metal ion, excess phosphoric acid has to be taken where the molar ratio of phosphorous to metal is greater than about n:1. For example, if the metal ion has a valence of +3, the molar ratio of phosphorous to the metal is greater than 3:1 (e.g., 5 moles or more of phosphorous for every mole of metal).

The polymerization step may be terminated when the product is soluble in about two weight percent citric acid or 0.1 normal hydrochloric acid. Without wishing to be bound by the theory, the product is preferably heated until just before it becomes insoluble in 0.1 wt. % citric acid or 0.01 normal hydrochloric acid, as over-polymerization may cause insolubilization in acid and reduce the availability of the nutrients to plants.

The polyphosphate composition product may be poured out of the reactor and cooled. When the product temperature reaches below about 90° C., water may be added to increase the product's fluidity; additionally, the polyphosphate composition product may be stirred to further enhance and/or maintain fluidity. The polyphosphate composition product may also be neutralized with a neutralizing base, dried and ground to a powder.

Preferable neutralizing bases include magnesium oxides, magnesium carbonates, calcium oxides, calcium carbonates, ammonium hydroxides, ammonium carbonates, sodium hydroxides, sodium carbonates, potassium hydroxides, potassium carbonates and combinations thereof. Bases are mixed with water prior to their use for neutralizing the polyphosphate. Without wishing to be bound by the theory, addition of water to the base reduces lumping of the neutralized polyphosphate. Preferably, the polyphosphate composition product is ground to an average particle size of less than about 200 mesh, alternatively less than about 150 mesh, alternatively less than about 100 mesh, alternatively less than about 80 mesh.

Utilization of Polyphosphate Compositions

The powdered polyphosphate composition product may be added to soil containing at least one plant to be fertilized. Alternatively, the powdered polyphosphate composition product may be added to soil, which will receive at least one plant to be fertilized. Without wishing to be bound by the theory, root systems of the plants will release acids to absorb nutrients from the soil. Accordingly, as the root system of the plants require nutrients they release acids which dissolves the powdered polyphosphate composition product and provides nourishment to the root system and plant.

The polyphosphate compositions may be mixed with various additives before being added to the soil. Suitable additives include other fertilizers, pesticides, agrichemicals, bentonite, and attapulgite. Non-limiting examples of other fertilizers include urea, diammonium phosphate and muriate of potash. Non-limiting examples of other pesticides include 2-4D, parathion, malation, and s-triazines. Non-limiting examples of other additives and agrichemicals include manure, gypsum, dolomite, and plant growth hormones.

Alternatively, the polyphosphate compositions may be used as a coating for granules of the above-listed other fertilizers, granules of china clay, bentonite, and attapulgite. Further, the polyphosphate compositions may be coated on seeds including soybean, corn and wheat. Still further, the polyphosphate compositions may be suspended, and added to the soil as a suspension. Furthermore, the polyphosphate compositions may be granulated alone or in combination with china clay, bentonite, attapulgite, or other fertilizers.

Another optional use of the polyphosphate compositions disclosed herein is as an animal feed supplement. The polyphosphate composition may be mixed with animal feeds such as grain Having described the invention in detail, it will be apparent that modifications and variations are possible without departing the scope of the invention defined in the appended claims. The following non-limiting examples are provided to further illustrate the present invention and those of skill in the art should, in light of the present disclosure, appreciate that many changes can be made in the specific embodiments that are disclosed and still obtain a like or similar result without departing from the spirit and scope of the invention.

EXAMPLES

The following methods were used to characterize the materials in the examples below:

Total cation content: 50 milligrams of sample was dissolved in 3 milliliters of concentrated sulphuric acid by heating for a few minutes. The solution was diluted and filtered. Cations in solution were analysed by atomic absorption spectroscopy.

Total phosphorus content: 50 milligrams of sample was fused with sodium hydroxide in a nickel crucible and taken into solution with water. Phosphorus was determined by the molybdenum blue color method. (Soil Chemical Analysis, ML Jackson, 1973, Prentice Hall, New Delhi).

Number Average Chain Length: The titrimetric method reported by Van Wazer was followed for the determination of number average chain length excluding ortho using the equation: [{2(total P−orthophosphate P)}/{endgroup P−orthophosphate P}] (Van Wazer, J. R. 1966. Phosphorus and its compounds, Vol. 1. Interscience, New York, N.Y.; Ray S K, Chandra P K, Varadachari C and Ghosh K (1998)). For removing micronutrient metal cation interferences prior to titrimetric determination of polyphosphate chain length, the sample was dissolved in 0.1N HCl and stirred with a cation exchange resin in H-form. The supernatant solution which was free of cations (except hydrogen) was titrated for polyphosphate chain length by the method of Van Wazer J. R. 1966 referred above).

For solubilities, mesh size of less than 150 mesh was used.

Water solubility: 50 milligrams of sample was placed in a conical flask and 50 milliliters of water was added to it. This was placed in a rotary shaker for 30 minutes, then filtered washed and made to volume. Cations in solution were analysed by atomic absorption spectroscopy. Amount of cation solubilized was expressed as a percentage of total cation determined as described above.

0.1N HCl solubility: Solubility of the samples in 0.1N HCl was determined as described above for citrate solubility.

Citrate solubility: 25 milligrams of samples was placed in a conical flask and 50 milliliters of 0.1% citric acid was added to it. It was placed in a rotary shaker for 20 minutes. It was then filtered washed and made to volume. Cations in solution were determined as described in the paragraph above. Solubilities in citrate are expressed as a percentage of that dissolved by 0.1 N HCl.

Citrate solubility: 25 milligrams of samples was placed in a conical flask and 50 milliliters of 0.2% citric acid was added to it. It was placed in a rotary shaker for 20 minutes. It was then filtered washed and made to volume. Cations in solution were determined as described in the paragraph above. Solubilities in citrate are expressed as a percentage of that dissolved by 0.1 N HCl.

EDTA solubility: Solubility of the samples in 0.005 M EDTA was determined as described above for citrate solubility. Solubilities in citrate are expressed as a percentage of that dissolved by 0.1 N HCl.

0.01N HCl solubility: Solubility of the samples in 0.01N HCl was determined as described above for citrate solubility. Solubilities in citrate are expressed as a percentage of that dissolved by 0.1 N HCl.

pH: pH of the fertilizers was recorded on a pH meter in a stirred suspension containing 1 gram of fertilizer powder in 10 milliliters water.

X-ray diffraction: XRD of the powdered sample was recorded in a X-ray diffractometer using Cu $K_\alpha$ radiation at a scan rate of 2° 2 theta per minute.

Example 1

Polyphosphate Fertilizer with Calcium

Equivalent Ratio Ca:P=0.59:1

The fertilizer of this example one was produced from phosphoric acid and calcium carbonate. Commercial grade phosphoric acid (58.4% $P_2O_5$), 66.3 grams, was placed in a beaker. In another beaker 50 milliliters of water was taken and 25.06 grams calcium carbonate was added to it to form a slurry. This slurry was added to the phosphoric acid with stirring. It was then heated in an oil bath for 10 minutes till the temperature of the liquid reached 70° C. At this stage the liquid became thick. A further 30 milliliters of water was added. It was heated for another 20 minutes till the liquid temperature reached 103° C.

The sample was removed from the oil bath and allowed to cool to about 80° C. Then 14 grams of calcium oxide was suspended in 100 milliliters of water and added to the phosphate liquid with stirring. At this stage a white suspension was formed and its pH was around 5.0. The product was poured in a drying dish and dried in an oven at 75° C. After it was dry, the sample was ground and sieved through a 150 mesh sieve.

On analysis, the product showed 19.12 weight percent phosphorus and 22 weight percent calcium. The ratio of moles of P:Ca was 1.1:1. The pH of a 10% suspension in water was 5.5. The number average chain length of the excluding orthophosphate was 4.9 and the number average chain length including ortho was 1.34. The orthophosphate content was 45 wt %. Solubility of calcium from this product in water was 1.1% of the total calcium. In 0.1 weight percent citric acid 97% of the total calcium dissolved. In 0.01 N hydrochloric acid 91% of the total calcium dissolved. In 0.005M EDTA, 99% of the total calcium dissolved. XRD peaks of this product is shown in Table 1. NMR peaks of this product are at 60.296, 29.824, −0.684, −31.248, −61.673 ppm.

Example 2

Polyphosphate Fertilizer with Magnesium

Equivalent Ratio Mg:P=0.72:1

The fertilizer of this example two was produced from phosphoric acid, and magnesium oxide. Commercial grade phosphoric acid (58.4% $P_2O_5$), 68.5 grams, was placed in a beaker. Then 10.3 grams magnesium oxide was suspended in 50 milliliters of water and the suspension was added to the phosphoric acid with stirring. It was then heated in an oil bath for 30 minutes till the liquid temperature reached 115° C.

After removing the sample it was allowed to cool to about 80° C. It was then neutralized with a suspension of magnesium oxide in water (14.5 grams MgO in 20 milliliters water) which was added in a stream with continuous stirring. At this stage a white suspension was formed. The product was poured in a drying dish and dried in an oven at 75° C. After it was dry, the sample was ground in a mortar. It was sieved through a 150 mesh sieve.

On analysis, the product showed 19 weight percent phosphorus and 16.1 weight percent magnesium. The ratio of moles of P:Mg was 0.93:1. The number average chain length excluding orthophosphate was 4.5 and the number average chain length including orthophosphate was 1.29. The orthophosphate content was 24.6 wt %. The pH of a 10% suspension in water was 6.3. Solubility of this product in water was 1.4% of the total magnesium. In 0.1 weight percent citric acid 98% of the total magnesium dissolved. In 0.01 N hydrochloric acid 97% of the total magnesium dissolved and in 0.005M EDTA, 98% of the total dissolved magnesium was soluble. XRD peaks of this product is shown in Table 1. NMR peaks of this product are at 58.169, 28.803, 26.496, 23.078, −0.593, −6.213, −30.075, −35.810 ppm.

Example 3

Polyphosphate Fertilizer with Calcium and Zinc

Equivalent Ratio Ca:P=0.58:1

The fertilizer of this example two was produced from phosphoric acid, calcium carbonate and zinc oxide. Commercial grade phosphoric acid (58.4% $P_2O_5$), 71.6 grams, was placed in a beaker. Then 25.06 grams calcium carbonate and 1.61 grams zinc oxide was suspended in 50 milliliters of water and the suspension was added to the phosphoric acid with stirring. It was then heated in an oil bath for 45 minutes till the temperature of the liquid reached 105° C. The beaker was removed from the heating unit and allowed to cool to about 70° C. Then a suspension of calcium oxide in water (14.5 grams CaO in 30 milliliters water) was added in a stream with continuous stirring. At this stage a white suspension was formed. The product was poured in a drying dish and dried in an oven at 75° C. After it was dry, the sample was ground by hand in a mortar. It was sieved through a 150 mesh sieve.

On analysis, the product showed 18.56 weight percent phosphorus, 20.7 weight percent calcium and 1.3 weight percent zinc. The ratio of moles of P:Ca:Zn was 30:26:1. The ratio of moles of P:Ca was 1.16:1. The pH of a 10% suspension in water was 6.5. Solubility of calcium from this product in water was 0.9% of the total calcium and 1% of total magnesium. In 0.1 weight percent citric acid 99% of the total calcium and 97% of the total zinc dissolved. In 0.01 N hydrochloric acid 99% of the total calcium and 98% of the total zinc dissolved. In 0.005M EDTA, 98% of the total calcium and 97% of total zinc dissolved. XRD peaks of this product is shown in Table 1. NMR of this product shows peaks at 60.165, 29.703, −0.709, −31.241, −61.572 ppm.

Example 4

Polyphosphate Fertilizer with Calcium, and Rock Phosphate

Equivalent Ratio Ca:P=0.57:1

The fertilizer of this example was produced from phosphoric acid, calcium carbonate and rock phosphate. Commercial grade phosphoric acid (58.5% $P_2O_5$), 17.1 grams, was placed in a beaker. Then 25 grams rock phosphate was suspended in 50 milliliters of water and the suspension was added to the phosphoric acid with stirring. It was then heated in an oil bath till the temperature of the liquid reached 105° C. Then a suspension of 4.6 grams of calcium carbonate in 20 milliliters water was added to it. The beaker was heated again for 15 minutes till the liquid temperature reached 105° C. whereupon it was removed from the oil bath. When the liquid had cooled to about 75° C., a suspension of calcium oxide in water (7 g CaO in 15 milliliters water) was added in a stream with continuous stirring. The product was poured in a drying dish and dried in an oven at 75° C. After it was dry, the sample was ground by hand in a mortar. It was sieved through a 150 mesh sieve.

On analysis, the product showed mainly 19.12 weight percent phosphorus and 21 weight percent calcium. The ratio of moles of P:Ca was 1.2:1. The pH of a 10% suspension in water was 7.2. Solubility of calcium from this product in water was 0.1% of the total calcium. In 0.1 weight percent citric acid 91% of the total calcium dissolved. In 0.01 N hydrochloric acid 88% of the total calcium dissolved. In 0.005M EDTA, 95% of the total calcium dissolved.

Example 5

Polyphosphate Fertilizer with Calcium and Magnesium

Equivalent Ratio (Ca+Mq):P=0.54:1

The fertilizer of this example was produced from phosphoric acid, calcium carbonate and magnesium oxide. Commercial grade phosphoric acid (58.4% $P_2O_5$), 83 grams, was placed in a beaker. Then 25.06 grams calcium carbonate and 8.1 grams magnesium oxide was suspended in 80 milliliters of water and the suspension was added to the phosphoric acid with stirring. Exothermic reaction occurs and the liquid temperature is raised to 70° C. It was then heated in an oil bath for 40 minutes till the temperature of the liquid reached 107° C. The beaker was removed from the heating unit and when the liquid had cooled to about 80° C., a suspension of calcium oxide in water (10.5 g CaO in 20 milliliters water) was added in a stream with continuous stirring. The product was poured in a drying dish and dried in an oven at 75° C. After it was dry, the sample was ground in a mortar. It was sieved through a 150 mesh sieve.

On analysis, the product showed 19.85 weight percent phosphorus, 13.1 weight percent calcium and 4.6 weight percent magnesium. The ratio of moles of P:Ca:Mg was 3.4:1.7:1. The ratio of moles of P:(Ca+Mg) was 1.24:1. The pH of a 10% suspension in water was 4.9. Solubility of calcium from this product in water was 0.6% of the total calcium and 4.7% of total magnesium. In 0.1 weight percent citric acid 98% of the total calcium and 98% of the total magnesium dissolved. In 0.01 N hydrochloric acid 97% of the total calcium and 98% of total magnesium dissolved. In 0.005M EDTA, 98% of the total calcium and magnesium dissolved. XRD for this product showed peaks at 6.8, 5.96, 5.37, 5.01, 4.7, 4.61, 4.5, 4.15, 3.7, 3.66, 3.58, 3.47, 3.39, 3.35, 3.19, 3.13, 3.09, 3.05, 2.96, 2.94, 2.82, 2.76, 2.73, 2.59, 2.53, 2.5, 2.43, 2.41, 2.39, 2.37, 2.34, 2.25, 2.2, 2.18, 2.16, 2.14, 2.12, 2.09, 2.08, 2.03, 1.99, 1.93, 1.91, 1.85, 1.8, 1.76, 1.72, 1.68, 1.64, 1.59 and 1.57 Å (Table 1).

Example 6

Polyphosphate Fertilizer with Calcium and Magnesium

Equivalent Ratio (Ca+Mq):P=0.66:1

The fertilizer of this example two was produced from phosphoric acid, calcium carbonate and magnesium oxide. Commercial grade phosphoric acid (58.4% $P_2O_5$), 83 grams, was placed in a beaker. Then 40 grams calcium carbonate and 8.1 grams magnesium oxide was suspended in 80 milliliters of water and the suspension was added to the phosphoric acid with stirring. Exothermic reaction occurs and the liquid temperature is raised to 70° C. It was then heated in an oil bath for 30 minutes till the temperature of the liquid reached 103° C. The beaker was removed from the heating unit and when the liquid had cooled to about 80° C., a suspension of calcium oxide in water (5 g CaO in 20 milliliters water) was added in a stream with continuous stirring. The product was poured in a drying dish and dried in an oven at 75° C. After it was dry, the sample was ground in a mortar. It was sieved through a 150 mesh sieve.

On analysis, the product showed 19.46 weight percent phosphorus, 17.6 weight percent calcium and 4.5 weight percent magnesium. The ratio of moles of P:Ca:Mg was 3.4:2.4:1. The ratio of moles of P:(Ca+Mg) was 1.01:1. The pH of a 10% suspension in water was 4.9. The number average chain length excluding orthophosphate was 4.5 and the number average chain length including orthophosphate was 1.83, The orthophosphate content was 20.5 wt % Solubility of calcium from this product in water was 0.4% of the total calcium and 4.9% of total magnesium. In 0.1 weight percent citric acid 95% of the total calcium and 96% of the total magnesium dissolved. In 0.01 N hydrochloric acid 96% of the total calcium and 98% of total magnesium dissolved. In 0.005M EDTA, 96% of the total calcium and 98% of total magnesium dissolved.

Example 7

Polyphosphate Fertilizer with Calcium and Potassium

Equivalent Ratio Ca:P=0.61:1

The fertilizer of this example three was produced from phosphoric acid, calcium carbonate and potassium chloride. Commercial grade phosphoric acid (58.4% $P_2O_5$), 99.5 grams, was placed in a beaker. Then 25.06 grams calcium carbonate and 10.58 grams magnesium oxide was suspended in 50 milliliters of water and the suspension was added to the phosphoric acid with stirring. It was then heated in an oil bath for 40 minutes till the temperature of the liquid reached 132° C. The beaker was removed from the heating unit and allowed to cool to about 80° C. Then a suspension of calcium oxide in water (28 grams CaO in 30 milliliters water) was added in a stream with continuous stirring. At this stage a white suspension was formed. The product was poured in a drying dish and dried in an oven at 75° C. After it was dry, the sample was ground by hand in a mortar. It was sieved through a 150 mesh sieve.

On analysis, the product showed 18.4 weight percent phosphorus, 21.7 weight percent calcium and 4 weight percent potassium. The ratio of moles of P:Ca:K was 5.8:5.3:1. The pH of a 10% suspension in water was 5.2. In 0.1 weight percent citric acid 97% of the total calcium and 96% of the total potassium dissolved. In 0.01 N hydrochloric acid 95% of the total calcium and 97% of the total potassium dissolved. In 0.005M EDTA, 94% of the total calcium and 96% of the total potassium dissolved. XRD peaks of this product is shown in Table 1. NMR of this product shows peaks at 57.461, 28.396, −0.513, −29.452, −58.652 ppm.

Example 8

Polyphosphate Fertilizer with Calcium, Magnesium and Boron

Equivalent Ratio (Ca+Ma):P=0.67:1

The fertilizer of this example was produced from phosphoric acid, magnesium oxide, boric acid and sodium carbonate. Commercial grade phosphoric acid (58.4% $P_2O_5$), 83 grams, was placed in a beaker. Then 40 grams calcium carbonate and 8.1 grams magnesium oxide was suspended in 80 milliliters of water and the suspension was added to the phosphoric acid with stirring. 6 grams sodium carbonate was then dissolved in a minimum volume of water and 10 grams of boric acid (17.3% B) was added to it. It was heated till the boric acid dissolved. This solution was added to the phosphoric acid solution containing calcium and magnesium. It was then heated in an oil bath for 30 minutes till the temperature of the liquid reached 107° C. The beaker was removed from the heating unit and when the liquid had cooled to about 80° C., a suspension of calcium oxide in water (5 g CaO in 20 milliliters water) was added in a stream with continuous stirring. The product was poured in a drying dish and dried in an oven at 75° C. After it was dry, the sample was ground in a mortar. It was sieved through a 150 mesh sieve.

On analysis, the product showed 18.7 weight percent phosphorus, 17.3 weight percent calcium, 4.3 weight percent magnesium and 1.48 weight percent boron. The ratio of moles of P:Ca:B was 4.4:3.1:1. The pH of a 10% suspension in water was 5.2. In 0.1 weight percent citric acid 98% of the total calcium dissolved. In 0.01 N hydrochloric acid 97% of the total calcium dissolved. In 0.005M EDTA, 99% of the total calcium dissolved.

Example 9

Polyphosphate Fertilizer with Calcium (Using Tricalcium Phosphate)

Equivalent Ratio Ca:P=0.7:1

The fertilizer of this example was produced from phosphoric acid, tricalcium phosphate and calcium oxide. Commercial grade phosphoric acid (58.4% $P_2O_5$), 53.9 grams, was placed in a beaker. Then 25 grams tricalcium phosphate suspended in 40 milliliters of water and was added to the phosphoric acid with stirring. The mixture was heated in an oil bath for 30 minutes till the temperature of the liquid reached 107° C. The beaker was removed from the heating unit and when the liquid had cooled to about 80° C., a suspension of calcium oxide in water (20 g CaO in 40 milliliters water) was added in a stream with continuous stirring. The product was poured in a drying dish and dried in an oven at 75° C. After it was dry, the sample was ground in a mortar. It was sieved through a 100 mesh sieve.

On analysis, the product showed 26.7 weight percent phosphorus and 24.7 weight percent calcium. The ratio of moles of P:Ca was 0.96:1. The pH of a 10% suspension in water was 4.5. Solubility of calcium from this product in water was 1.9% of the amount of calcium that dissolves in 0.1 N HCl in 20 minutes. Solubility of calcium in 0.1 weight percent citric acid was 83% of the calcium that dissolves in 0.1N HCl in 20 minutes. Solubility of calcium in 0.2 wt % citric acid was 96% of calcium that dissolved in 0.1N HCl in 20 minutes. Solubility of calcium in 0.01 N hydrochloric acid and in 0.005M EDTA was 82% and 94% respectively, of the amount of calcium that dissolves in 0.1N HCl in 20 minutes. The number average chain length of the product excluding orthophosphate was 2.93 and the number average chain length including ortho was 1.4. The orthophosphate content was 57 wt %. XRD of this sample is shown in Table 1.

Example 10

Polyphosphate Fertilizer with Calcium (Using Tricalcium Phosphate)

Equivalent Ratio Ca:P=0.66:1

The fertilizer of this example one was produced from phosphoric acid tricalcium phosphate and calcium oxide. Commercial grade phosphoric acid (58.4% $P_2O_5$), 68.6 grams, was placed in a beaker. In another beaker 50 milliliters of water was taken and 25 grams tricalcium phosphate was added to it to form a slurry. This slurry was added to the phosphoric acid with stirring. It was then heated in an oil bath for 25 minutes till the temperature of the liquid reached 109° C.

The sample was removed from the oil bath. Then 35 grams of calcium oxide was suspended in 60 milliliters of water and added to the reaction mixture with stirring. At this stage a white suspension was formed and its pH was around 3.5. The product was poured in a drying dish and dried in an oven at 70° C. After it was dry, the sample was ground and sieved through a 150 mesh sieve.

On analysis, the product showed 24.4 weight percent phosphorus and 31.2 weight percent calcium. The ratio of moles of P:Ca was 1.01:1. The pH of a 10% suspension in water was 3.5. Solubility of calcium from this product in water was 1.8% of the amount of calcium that dissolves in 0.1 N HCl in 20 minutes. Solubility of phosphorus from this product in water was 9.8% of the total phosphorus in it. Solubility of calcium in 0.2 wt % citric acid was 85% of calcium that dissolved in 0.1N HCl in 20 minutes.

Example 11

Polyphosphate Fertilizer with Calcium (Using Tricalcium Phosphate)

Equivalent Ratio Ca:P=0.66:1

The fertilizer of this example one was produced as described in Example 10 from phosphoric acid tricalcium phosphate and calcium oxide. Here, 36 grams of commercial grade phosphoric acid (58.4% $P_2O_5$), was used together with 25 grams tricalcium phosphate. The mixture was heated to was heated 106° C. and neutralized with 14 grams calcium oxide. The product was then ground and sieved through a 150 mesh sieve.

On analysis, the product showed 24.3 weight percent phosphorus and 30.9 weight percent calcium. The ratio of moles of P:Ca was 1.02:1. The pH of a 10% suspension in water was 5.4. Solubility of calcium from this product in water was 1.5% of the amount of calcium that dissolves in 0.1N HCl in 20 minutes. Solubility of phosphorus from this product in water was 9.6% of the total phosphorus in it. Solubility of calcium in 0.2 wt % citric acid was 93% of calcium that dissolved in 20 minutes. Solubility of calcium in 0.01 N hydrochloric acid and in 0.005M EDTA was 79% and 87% respectively, of the amount of calcium that dissolves in 0.1N HCl in 20 minutes.

Example 12

Polyphosphate Fertilizer with Calcium (using tricalcium phosphate)

Equivalent Ratio Ca:P=0.71:1

The fertilizer of this example one was produced as described in Example 9 except that the mixture was heated to 110° C. and neutralized with 22 grams calcium oxide.

On analysis, the product showed 19.2 weight percent phosphorus and 26.5 weight percent calcium. The ratio of moles of P:Ca was 0.94:1. The pH of a 10% suspension in water was 5. Solubility of calcium from this product in water was 1.1% of the calcium that dissolves in 0.1N HCl in 20 minutes. Solubility of calcium in 0.01 N hydrochloric acid and in 0.005M EDTA was 59% and 71% respectively, of the amount of calcium that dissolves in 0.1 N HCl in 20 minutes. Solubility of calcium in 0.1 wt % citric acid was 63% of calcium that dissolved in 20 minutes.

Example 13

Polyphosphate Fertilizer with Calcium and Magnesium

Equivalent Ratio (Ca+Mg):P=0.63:1

The fertilizer of this example was produced from phosphoric acid, tricalcium phosphate, magnesium oxide and calcium oxide. Commercial grade phosphoric acid (58.4% $P_2O_5$), 72 grams, was placed in a beaker. Then 25 grams tricalcium phosphate and 2.44 grams magnesium oxide was suspended in 45 milliliters of water and the suspension was added to the phosphoric acid with stirring. It was then heated in an oil bath for 30 minutes till the temperature of the liquid reached 109° C. The beaker was removed from the heating unit and mixed with a suspension of calcium oxide in water (32 g CaO in 50 milliliters water. The product was dried in an oven at 75° C. and ground in a mortar. It was sieved through a 100 mesh sieve.

On analysis, the product showed 22 weight percent phosphorus, 24.2 weight percent calcium and 1.8 weight percent magnesium. The ratio of moles of P:(Ca+Mg) was 1.07:1. The pH of a 10% suspension in water was 3.6. Solubility of calcium and magnesium from this product in water was 2.5% and 0.3% respectively, of the calcium and magnesium that dissolved in 0.1N HCl in 20 minutes. Solubility of calcium and magnesium in 0.01 N hydrochloric acid was 99% and 100% respectively, of the calcium and magnesium that dissolved in 0.1N HCl in 20 minutes. Solubility in 0.005M EDTA was 100% of the calcium and magnesium of the calcium and magnesium that dissolved in 0.1N HCl in 20 minutes. Solubility of calcium and magnesium in 0.2 wt % citric acid was 100% of calcium and magnesium that dissolved in 0.1 N HCl in 20 minutes.

Example 14

Polyphosphate Fertilizer with Rock Phosphate

Equivalent Ratio Ca:P=0.56:1

The fertilizer of this example was produced from phosphoric acid, rock phosphate (apatite) and calcium carbonate. Commercial grade phosphoric acid (58.4% $P_2O_5$), 59.5 grams, was placed in a beaker. Then 30 grams rock phosphate was suspended in 35 milliliters of water and the suspension was added to the phosphoric acid with stirring. It was then heated in an oil bath for 30 minutes till the temperature of the liquid reached 112° C. The beaker was removed from the heating unit and mixed with a suspension of calcium carbonate in water (42 g CaO in 140 milliliters water. The product was dried in an oven at 75° C. and ground in a mortar.

On analysis, the product showed 24.3 weight percent phosphorus and 25.9 weight percent calcium. The ratio of moles of P:(Ca+Mg) was 1.22:1. The pH of a 10% suspension in water was 4.5. Solubility of calcium from this product in water was 2.8% of the calcium and magnesium that dissolved in 0.1N HCl in 20 minutes. Solubility of phosphorus from this product in water was 12.6% of the total phosphorus in it. Solubility of calcium in 0.1 weight percent citric acid was 77% of the total calcium dissolved in 20 minutes. Solubility of calcium in 0.2 wt % citric acid was 89% of calcium that dissolved in 0.1N HCl in 20 minutes.

Example 15

Polyphosphate Fertilizer with Calcium and Magnesium

Equivalent Ratio (Ca+Ma):P=0.7:1

The fertilizer of this example was produced from phosphoric acid, calcium carbonate and magnesium carbonate. Commercial grade phosphoric acid (58.4% $P_2O_5$), 95 grams, was placed in a beaker. Then 25 grams calcium carbonate and 5.27 grams magnesium carbonate was suspended in 70 milliliters of water and the suspension was added to the phosphoric acid with stirring. It was then heated in an oil bath for 20 minutes till the temperature of the liquid reached 105° C. The beaker was removed from the heating unit and mixed with a suspension of calcium carbonate in water (50 g $CaCO_3$ in 50 milliliters water. The product was dried in an oven at 70° C. and ground in a mortar. It was sieved through a 150 mesh sieve.

On analysis, the product showed 22.6 weight percent phosphorus, 27.7 weight percent calcium and 1.8 weight percent magnesium. The ratio of moles of P:(Ca+Mg) was 0.95:1. The pH of a 10% suspension in water was 4.1. Solubility of calcium and magnesium from this product in water was 1.4% and 0.4% of the calcium and magnesium that dissolved in 0.1 N HCl in 20 minutes. Solubility of calcium and magnesium from this product in 0.01 N HCl was 97% and 99% of the calcium and magnesium that dissolved in 0.1N HCl in 20 minutes. Solubility of phosphorus from this product in water was 21% of the total phosphorus. Solubility of calcium and magnesium from this product in water was 1.4% and 0.4% of the calcium and magnesium that dissolved in 0.1 N HCl in 20 minutes. Solubility of calcium and magnesium from this product 0.1 weight percent citric acid was 75.2% and 78.9% of the calcium and magnesium that dissolved in 0.1N HCl in 20 minutes.

Example 16

Polyphosphate Fertilizer with Rock Phosphate and Zinc

Equivalent Ratio Ca:P=0.6:1

The fertilizer of this example was produced from phosphoric acid, rock phosphate, zinc oxide and calcium oxide. Commercial grade phosphoric acid (58.4% $P_2O_5$), 78 grams, was placed in a beaker. Then 30 grams rock phosphate and 5 grams zinc oxide was suspended in 50 milliliters of water and the suspension was added to the phosphoric acid with stirring. It was then heated in an oil bath for 20 minutes till the temperature of the liquid reached 109° C. The beaker was removed from the heating unit and mixed with a suspension of calcium oxide in water (42 g CaO in 70 milliliters water). The product was dried in an oven at 70° C. and ground in a mortar. It was sieved through a 150 mesh sieve.

On analysis, the product showed 19.6 weight percent phosphorus, 22.8 weight percent calcium and 4.6 weight percent zinc. The ratio of moles of P:Ca was 1.1:1. The pH of a 10% suspension in water was 4.9. Solubility of calcium and magnesium from this product in water was 1.7% and 0.7% of the calcium and zinc that dissolved in 0.1N HCl in 20 minutes. Solubility of phosphorus from this product in water was 16.6% of the total phosphorus. Solubility of calcium and magnesium from this product in 0.01N HCl was 75% and 100% of the calcium and zinc that dissolved in 0.1N HCl in 20 minutes. Solubility of calcium and magnesium from this product in 0.1 weight percent citric acid was 75.2% and 84% of the calcium and zinc that dissolved in 0.1 N HCl in 20 minutes. Solubility of calcium and magnesium from this product in 0.2 weight percent citric acid was 91% and 94% of the calcium and zinc that dissolved in 0.1 N HCl in 20 minutes.

Example 17

Polyphosphate Fertilizer with Calcium and Zinc

Equivalent Ratio Ca:P=0.61:1

The fertilizer of this example was produced from phosphoric acid, zinc oxide and calcium carbonate. Commercial grade phosphoric acid (58.4% $P_2O_5$), 122 grams, was placed in a beaker. Then 25 calcium carbonate and 12.5 grams zinc oxide was suspended in 200 milliliters of water and the suspension was added to the phosphoric acid with stirring. It was then heated in an oil bath for 15 minutes till the temperature of the liquid reached 107° C. The beaker was removed from the heating unit and mixed with a suspension of calcium carbonate in water (67 g $CaCO_3$ in 100 milliliters water). The product was dried in an oven at 65° C. and ground in a mortar. It was sieved through a 150 mesh sieve.

On analysis, the product showed 22.5 weight percent phosphorus, 26.5 weight percent calcium and 7.2 weight percent zinc. The ratio of moles of P:Ca was 1.1:1. The pH of a 10% suspension in water was 4.6. Solubility of calcium and zinc from this product in water was 2.2% and 0.4% of the calcium and zinc that dissolved in 0.1 N HCl in 20 minutes. Solubility of calcium and zinc from this product in 0.01N HCl was 87% and 82% of the calcium and zinc that dissolved in 0.1 N HCl in 20 minutes. Solubility of calcium and zinc from this product in 0.005M EDTA was 92% and 89% of the calcium and zinc that dissolved in 0.1N HCl in 20 minutes. Solubility of calcium and zinc that dissolved from this product in 0.1 weight percent citric acid was 81% and 84% of the calcium and zinc that dissolved in 0.1N HCl in 20 minutes. XRD of this product ios shown in Table 1.

Example 18

Polyphosphate Fertilizer with Calcium and Iron

Equivalent Ratio Ca:P=0.54:1

The fertilizer of this example was produced from phosphoric acid, tricalcium phosphate, magnetite and calcium carbonate. Commercial grade phosphoric acid (58.4% $P_2O_5$), 92 grams, was placed in a beaker. Then 25 tricalcium phosphate and 7.25 grams magnetite was suspended in 90 milliliters of water and the suspension was added to the phosphoric acid with stirring. It was then heated in an oil bath for 15 minutes till the temperature of the liquid reached 102° C. The beaker was removed from the heating unit and mixed with a suspension of calcium carbonate in water (62 g $CaCO_3$ in 100 milliliters water). The product was dried in an oven at 65° C. and ground in a mortar. It was sieved through a 150 mesh sieve.

On analysis, the product showed 23.1 weight percent phosphorus, 24.1 weight percent calcium and 4 weight percent iron. The ratio of moles of P:Ca was 1.24:1. The pH of a 10% suspension in water was 3.9. Solubility of calcium and magnesium from this product in water was 2.4% and 1.4% of the calcium and iron that dissolved in 0.1 N HCl in 20 minutes. Solubility of phosphorus from this product in water was 12.5% of the total phosphorus. Solubility of calcium from this product in 0.01 N HCl was 77.9% of the calcium that dissolved in 0.1N HCl in 20 minutes. Solubility of calcium and iron from this product in 0.005M EDTA was 85% and 84% of the calcium and iron that dissolved in 0.1N HCl in 20 minutes. Solubility of calcium and iron from this product in 0.1 weight percent citric acid was 79% and 74% of the calcium and iron that dissolved in 0.1 N HCl in 20 minutes. Solubility of calcium and iron from this product in 0.2 weight percent citric acid was 86% and 81% of the calcium and iron that dissolved in 0.1 N HCl in 20 minutes. XRD of this product ios shown in Table 1.

Example 19

Polyphosphate Fertilizer with Calcium and Manganese

Equivalent Ratio Ca:P=0.72:1

The fertilizer of this example was produced from phosphoric acid, tricalcium phosphate, manganous oxide and calcium carbonate. Commercial grade phosphoric acid (58.4% $P_2O_5$), 82 grams, was placed in a beaker. Then 25 tricalcium phosphate and 8.3 grams manganous oxide was suspended in 75 milliliters of water and the suspension was added to the phosphoric acid with stirring. It was then heated in an oil bath for 15 minutes till the temperature of the liquid reached 102° C. The beaker was removed from the heating unit and mixed with a suspension of calcium carbonate in water (50 g $CaCO_3$ in 125 milliliters water). The product was dried in an oven at 70° C. and ground in a mortar. It was sieved through a 150 mesh sieve.

On analysis, the product showed 18.4 weight percent phosphorus, 25.9 weight percent calcium and 4 weight percent manganese. The ratio of moles of P:Ca was 0.92:1. The pH of a 10% suspension in water was 6.1. Solubility of calcium and manganese from this product in water was 3.9% and 0.2% of the calcium and manganese that dissolved in 0.1 N HCl in 20 minutes. Solubility of phosphorus from this product in water was 19.6% of the total phosphorus. Solubility of calcium and manganese from this product in 0.01N HCl was 82% and 95% respectively, of the calcium and manganese that dissolved in 0.1N HCl in 20 minutes. Solubility of calcium and manganese from this product in 0.005M EDTA was 100% and 100% of the calcium and manganese that dissolved in 0.1N HCl in 20 minutes. Solubility of calcium and manganese from this product in 0.1 weight percent citric acid was 89% and 94% of the calcium and manganese that dissolved in 0.1N HCl in 20 minutes. XRD of this product ios shown in Table 1.

Example 20

Polyphosphate Fertilizer with Calcium and Boron

Equivalent Ratio Ca:P=0.60:1

The fertilizer of this example was produced from phosphoric acid, tricalcium phosphate, boric acid, sodium carbonate and calcium carbonate. Commercial grade phosphoric acid (58.4% $P_2O_5$), 54 grams, was placed in a beaker. Then 11.4 grams boric acid and 15.4 grams sodium carbonate were suspended in 80 milliliters water and heated to dissolve. Then 25 tricalcium phosphate was suspended in 55 milliliters of water and the suspension was added to the phosphoric acid with stirring. It was then heated in an oil bath for 15 minutes till the temperature of the liquid reached 95° C. The solution of neutralized boric acid was added to it and heating was continued till the temperature reached 105° C. Heating was discontinued and after the suspension cooled to around 90° C., it was mixed with a suspension of calcium carbonate in water (30 g $CaCO_3$ in 100 milliliters water). The product was dried in an oven at 80° C. and ground in a mortar. It was sieved through a 150 mesh sieve.

On analysis, the product showed 18 weight percent phosphorus, 21 weight percent calcium and 1.9 weight percent boron. The ratio of moles of P:Ca was 1.11:1. The pH of a 10% suspension in water was 6.1. Solubility of calcium from this product in water was 3.4% of the calcium that dissolved in 0.1N HCl in 20 minutes. Solubility of calcium and boron from this product in 0.01N HCl was 100% and 100% respectively, of the calcium and boron that dissolved in 0.1 N HCl in 20 minutes. Solubility of calcium and boron from this product in 0.005M EDTA was 100% and 100% of the calcium and boron that dissolved in 0.1N HCl in 20 minutes. Solubility of calcium and boron from this product in 0.1 weight percent citric acid was 95% and 98% of the calcium and boron that dissolved in 0.1N HCl in 20 minutes. Solubility of calcium and boron from this product in 0.2 weight percent citric acid was 96% and 99% of the calcium and boron that dissolved in 0.1N HCl in 20 minutes.

Example 21

Polyphosphate Fertilizer with Calcium and Boron

Equivalent Ratio Ca:P=0.57:1

The fertilizer of this example was produced from phosphoric acid, tricalcium phosphate, borax and calcium carbonate. Commercial grade phosphoric acid (58.4% $P_2O_5$), 54 grams, was placed in a beaker. Then 17.64 grams borax was dissolved in 75 milliliters water and heated to dissolve. Then 25 tricalcium phosphate was suspended in 55 milliliters of water and the suspension was added to the phosphoric acid with stirring. It was then heated in an oil bath for 15 minutes till the temperature of the liquid reached 95° C. The solution of borax was added to it and heating was continued till the temperature reached 105° C. Heating was discontinued and after the suspension cooled to around 90° C., it was mixed with a suspension of calcium carbonate in water (30 g $CaCO_3$ in 100 milliliters water). The product was dried in an oven at 80° C. and ground in a mortar. It was sieved through a 150 mesh sieve.

On analysis, the product showed 21.8 weight percent phosphorus, 24.1 weight percent calcium and 2.1 weight percent boron. The ratio of moles of P:Ca was 1.17:1. The pH of a 10% suspension in water was 5.0. Solubility of calcium from this product in water was 3.4% of the calcium that dissolved in 0.1 N HCl in 20 minutes. Solubility of phosphorus from this product in water was 21.7% of the total phosphorus. Solubility of calcium and boron from this product in 0.01 N HCl was 100% and 100% respectively, of the calcium and boron that dissolved in 0.1N HCl in 20 minutes. Solubility of calcium and boron from this product in 0.005M EDTA was 100% and 100% of the calcium and boron that dissolved in 0.1 N HCl in 20 minutes. Solubility of calcium and boron from this product in 0.1 weight percent citric acid was 97% and 99% of the calcium and boron that dissolved in 0.1 N HCl in 20 minutes. XRD of this product ios shown in Table 1.

Example 22

Polyphosphate Fertilizer with Calcium and Sulfur

Equivalent Ratio Ca:P=1.01:1 Also (P+S):Ca=0.97:1

The fertilizer of this example was produced from phosphoric acid, tricalcium phosphate, sulfuric acid and calcium carbonate. Commercial grade phosphoric acid (58.4% $P_2O_5$), 36.2 grams, was placed in a beaker. Then 25 tricalcium phosphate was suspended in 50 milliliters of water and the suspension was added to the phosphoric acid with stirring. Then 25 grams of concentrated sulfuric acid was added to it. The suspension was heated in an oil bath for 20 minutes till the temperature of the liquid reached 108° C. Heating was discontinued and after the suspension cooled to around 90° C., it was mixed with a suspension of calcium carbonate in water (50 g $CaCO_3$ in 100 milliliters water). The product was dried in an oven at 80° C. and ground in a mortar. It was sieved through a 150 mesh sieve.

On analysis, the product showed 14.6 weight percent phosphorus, 28.5 weight percent calcium and 7 weight percent sulfur. The ratio of moles of P:Ca was 0.66:1 and (P+S):Ca was 0.97:1. The pH of a 10% suspension in water was 4.3. Solubility of calcium from this product in water was 4.2% of the calcium that dissolved in 0.1N HCl in 20 minutes. Solubility of phosphorus from this product in water was 20.4% of the total phosphorus. Solubility of calcium and sulfur from this product in 0.01 N HCl was 85% and 93% respectively, of the calcium and sulfur that dissolved in 0.1 N HCl in 20 minutes. Solubility of calcium and sulfur from this product in 0.005M EDTA was 95% and 100% of the calcium and sulfur that dissolved in 0.1N HCl in 20 minutes. Solubility of calcium and sulfur from this product in 0.1 weight percent citric acid was 89% and 94% of the calcium and sulfur that dissolved in 0.1 N HCl in 20 minutes. Solubility of calcium and sulfur from this product in 0.2 weight percent citric acid was 97% and 100% of the calcium and sulfur that dissolved in 0.1 N HCl in 20 minutes.

Example 24

Polyphosphate Fertilizer with Calcium, Sulfur and Zinc

Equivalent Ratio Ca:P=0.84:1 and Ca:(P+S)=0.89:1

The fertilizer of this example was produced from phosphoric acid, calcium sulfate ($CaSO_4.0.5H_2O$), zinc oxide and calcium carbonate. Commercial grade phosphoric acid (58.4% $P_2O_5$), 62.8 grams, was placed in a beaker. Then 30 grams of calcium sulfate and 5 grams of zinc oxide were mixed with in 60 milliliters of water and the suspension was added to the phosphoric acid with stirring. The suspension was heated in an oil bath for 20 minutes till the temperature of the liquid reached 110° C. Heating was discontinued and after the suspension cooled to around 90° C., it was mixed with a suspension of calcium carbonate in water (57 g $CaCO_3$ in 150 milliliters water). The product was dried in an oven at 80° C. and ground in a mortar. It was sieved through a 100 mesh sieve.

On analysis, the product showed 16.1 weight percent phosphorus, 26.2 weight percent calcium, 3 weight percent zinc and 5 weight percent sulfur. The ratio of moles of P:Ca was 0.79:1. The pH of a 10% suspension in water was 4.4. Solubility of calcium from this product in water was 4.4% of the calcium that dissolved in 0.1 N HCl in 20 minutes. Solubility of phosphorus from this product in water was 20.4% of the total phosphorus. Solubility of calcium and sulfur from this product in 0.01 N HCl was 85% and 93% respectively, of the calcium and sulfur that dissolved in 0.1 N HCl in 20 minutes. Solubility of calcium and sulfur from this product in 0.005M EDTA was 95% and 100% of the calcium and sulfur that dissolved in 0.1 N HCl in 20 minutes. Solubility of calcium and sulfur from this product in 0.1 weight percent citric acid was 89% and 94% of the calcium and sulfur that dissolved in 0.1 N HCl in 20 minutes.

Example 26

Polyphosphate Fertilizer with Calcium and Zinc

Equivalent Ratio Ca:P=0.59:1

The fertilizer of this example was produced from phosphoric acid, tricalcium phosphate, zinc oxide and calcium carbonate. Commercial grade phosphoric acid (58.4% $P_2O_5$), 72.5 grams, was placed in a beaker. Then 25 tricalcium phosphate and 5 grams zinc oxide was suspended in 45 milliliters of water and the suspension was added to the phosphoric acid with stirring. It was then heated in an oil bath for 15 minutes till the temperature of the liquid reached 109° C. The beaker was removed from the heating unit and mixed with a suspension of calcium carbonate in water (50 g $CaCO_3$ in 100 milliliters water). The product was dried in an oven at 75° C. and ground in a mortar. It was sieved through a 150 mesh sieve.

On analysis, the product showed 22 weight percent phosphorus, 25.1 weight percent calcium and 3.5 weight percent zinc. The ratio of moles of P:Ca was 1.14:1. The pH of a 10% suspension in water was 4.9. Solubility of calcium and zinc from this product in water was 1.9% and 0.3% of the calcium and zinc that dissolved in 0.1 N HCl in 20 minutes. Solubility of phosphorus from this product in water was 11.6% of the total phosphorus. Solubility of calcium and zinc from this product in 0.01 N HCl was 80% and 100% of the calcium and zinc that dissolved in 0.1N HCl in 20 minutes. Solubility of calcium and iron from this product in 0.005M EDTA was 98% and 100% of the calcium and zinc that dissolved in 0.1N HCl in 20 minutes. Solubility of calcium and zinc that dissolved from this product in 0.1 weight percent citric acid was 83.5% and 98% of the calcium and zinc that dissolved in 0.1 N HCl in 20 minutes. The number average chain length of the product excluding orthophosphate was 9.5 and the number average chain length including ortho was 1.47. The orthophosphate content was 36 wt %.

Example 27

Polyphosphate Fertilizer with Calcium (Using Tricalcium Phosphate)

Equivalent Ratio Ca:P=0.79:1

The fertilizer of this example one was produced from phosphoric acid tricalcium phosphate and calcium carbonate. Commercial grade phosphoric acid (58.4% $P_2O_5$), 85 grams, was placed in a beaker. In another beaker 60 milliliters of water was taken and 25 grams tricalcium phosphate was added to it to form a slurry. This slurry was added to the phosphoric acid with stirring. It was then heated in an oil bath for 40 minutes till the temperature of the liquid reached 112° C. Further 10 grams of phosphoric acid was added and the suspension was heated again to 140° C.

The sample was removed from the oil bath. Then 95 grams of calcium carbonate was suspended in 150 milliliters of water and added to the reaction mixture with stirring. At this stage a white suspension was formed and its pH was around 4.5. The product was poured in a drying dish and dried in an oven at 70° C. After it was dry, the sample was ground and sieved through a 150 mesh sieve.

On analysis, the product showed 22 weight percent phosphorus and 33.7 weight percent calcium. The ratio of moles of P:Ca was 0.84:1. The pH of a 10% suspension in water was 4.5. Solubility of calcium from this product in water was 1.2% of the amount of calcium that dissolves in 0.1N HCl in 20 minutes. Solubility of phosphorus from this product in water was 7.2% of the total phosphorus in it. Solubility of calcium in 0.01 N hydrochloric acid and in 0.005M EDTA was 93% and 97% respectively, of the amount of calcium that dissolves in 0.1N HCl in 20 minutes. Solubility of calcium in 0.1 wt % citric acid was 86% of calcium that dissolved in 20 minutes. The number average chain length of the product excluding orthophosphate was 4.2 and the number average chain length including ortho was 1.92. The orthophosphate content was 32 wt %.

Example 28

Polyphosphate Fertilizer with Calcium (Using Tricalcium Phosphate)

Equivalent Ratio Ca:P=0.76:1

The fertilizer of this example one was produced from phosphoric acid tricalcium phosphate and calcium carbonate. Commercial grade phosphoric acid (58.4% $P_2O_5$), 95 grams, was placed in a beaker. It was then heated in an oil bath for 40 minutes till the temperature of the liquid reached 175° C. In another beaker 60 milliliters of water was taken and 25 grams tricalcium phosphate was added to it to form a slurry. This slurry was added to the phosphoric acid with stirring. It was then heated again to 150° C. and then the sample was removed from the oil bath. Then 90 grams of calcium carbonate was suspended in 150 milliliters of water and added to the reaction mixture with stirring. At this stage a white suspension was formed and its pH was around 4.9. The product was poured in a drying dish and dried in an oven at 70° C. After it was dry, the sample was ground and sieved through a 150 mesh sieve.

On analysis, the product showed 23 weight percent phosphorus and 30 weight percent calcium. The ratio of moles of P:Ca was 0.88:1. The pH of a 10% suspension in water was 4.9. Solubility of calcium from this product in water was 1% of the amount of calcium that dissolves in 0.1N HCl in 20 minutes. Solubility of phosphorus from this product in water was 6.5% of the total phosphorus in it. Solubility of calcium in 0.01 N hydrochloric acid and in 0.005M EDTA was 90% and 93% respectively, of the amount of calcium that dissolves in 0.1N HCl in 20 minutes. Solubility of calcium in 0.1 wt % citric acid was 82% of calcium that dissolved in 20 minutes. Solubility of calcium in 0.2 wt % citric acid was 94% of calcium that dissolved in 20 minutes. The number average chain length of the product excluding orthophosphate was 6.4 and the number average chain length including ortho was 2.6. The orthophosphate content was 24 wt %.

PROPHETIC EXAMPLE

Polyphosphate Fertilizer with Calcium and Manganese

The fertilizer of this example would be produced from phosphoric acid, calcium carbonate and manganous oxide. Commercial grade phosphoric acid (58.4% $P_2O_5$), 71.6 grams, would be placed in a beaker. Then 25.06 grams calcium carbonate and 1.42 grams manganous oxide suspended in 50 milliliters of water would be added to the phosphoric acid with stirring. It would be heated on an oil bath till the liquid became fairly thick but remained pourable. The liquid temperature at this stage would be less than 110° C. The liquid would then be neutralized with a suspension of calcium oxide in water with continuous stirring till the pH of the suspension reached 4-5. The product would be dried, ground and sieved.

TABLE 1

Xray Diffraction data

| Example 1 | Example 2 | Example 3 | Example 5 | Example 7 | Example 9 | Example 21 | Example 18 | Example 17 | Example 19 |
|---|---|---|---|---|---|---|---|---|---|
| 10.1565 | 7.6879 | 15.6121 | 6.8 | 18.8003 | 6.7185 | 7.5136 | 7.5612 | 8.4314 | 7.5222 |
| 9.4289 | 6.7243 | 8.5395 | 5.96 | 13.2361 | 5.0116 | 6.6765 | 6.7317 | 6.7167 | 4.2153 |
| 6.7688 | 5.9129 | 6.7481 | 5.37 | 11.6612 | 4.2598 | 4.2152 | 6.2437 | 4.5098 | 3.7837 |
| 5.9606 | 5.3156 | 6.0223 | 5.01 | 8.3331 | 4.015 | 3.4706 | 4.989 | 4.1387 | 3.3487 |
| 5.3515 | 5.0918 | 5.4567 | 4.7 | 6.7121 | 3.6838 | 3.3657 | 4.2278 | 3.721 | 3.0345 |
| 4.996 | 4.6937 | 4.983 | 4.61 | 5.9122 | 3.4794 | 3.3328 | 3.7872 | 3.3346 | 2.9175 |
| 4.718 | 4.59 | 4.5053 | 4.5 | 5.3858 | 3.3682 | 3.1722 | 3.4728 | 3.0999 | 2.8435 |
| 4.5016 | 4.4765 | 4.4066 | 4.15 | 5.3093 | 3.118 | 3.1149 | 3.3701 | 2.9447 | 2.7514 |
| 4.4048 | 4.3732 | 4.2735 | 3.7 | 4.9767 | 3.0406 | 3.0353 | 3.1197 | 2.7539 | 2.7017 |
| 4.2803 | 4.2684 | 4.1577 | 3.66 | 4.8836 | 2.9526 | 2.9477 | 3.0414 | 2.7114 | 2.617 |
| 4.1451 | 4.1346 | 4.0308 | 3.58 | 4.6853 | 2.8778 | 2.9187 | 2.9543 | 2.5809 | 2.5939 |
| 4.0367 | 3.6824 | 3.7073 | 3.47 | 4.5854 | 2.7535 | 2.749 | 2.8453 | 2.4886 | 2.4892 |
| 3.7069 | 3.6448 | 3.4849 | 3.39 | 4.4821 | 2.7164 | 2.7127 | 2.753 | 2.2518 | 2.429 |
| 3.4931 | 3.5687 | 3.3752 | 3.35 | 4.1311 | 2.5767 | 2.6164 | 2.7177 | 2.1897 | 2.252 |
| 3.37 | 3.4564 | 3.3493 | 3.19 | 3.8723 | 2.493 | 2.4901 | 2.6203 | 2.1521 | 2.1657 |
| 3.3563 | 3.367 | 3.2967 | 3.13 | 3.6813 | 2.346 | 2.418 | 2.4902 | 2.1109 | 2.1419 |
| 3.1255 | 3.341 | 3.1222 | 3.09 | 3.5645 | 2.3001 | 2.2991 | 2.4227 | 2.091 | 2.0801 |
| 3.0921 | 3.3144 | 2.9567 | 3.05 | 3.5318 | 2.2472 | 2.2467 | 2.3026 | 1.9819 | 2.0207 |
| 3.0469 | 3.2842 | 2.9325 | 2.96 | 3.4517 | 2.1968 | 2.19 | 2.2495 | 1.9079 | 1.9962 |
| 2.9914 | 3.1808 | 2.8805 | 2.94 | 3.37 | 2.1559 | 2.1515 | 2.1977 | 1.8431 | 1.9706 |
| 2.9584 | 3.1156 | 2.7605 | 2.82 | 3.3438 | 2.1336 | 2.0916 | 2.1517 | 1.7185 | 1.8725 |
| 2.9362 | 3.0777 | 2.7221 | 2.76 | 3.182 | 2.1149 | 2.0269 | 2.0941 | 1.6602 | 1.8536 |
| 2.8819 | 3.0363 | 2.6647 | 2.73 | 3.1143 | 2.0682 | 1.9949 | 2.0345 | 1.6052 | 1.8133 |
| 2.7572 | 2.9535 | 2.5841 | 2.59 | 3.077 | 2.0317 | 1.9102 | 1.9934 | | 1.7952 |
| 2.7279 | 2.9258 | 2.4944 | 2.53 | 3.0284 | 1.9945 | 1.846 | 1.9126 | | 1.706 |
| 2.5815 | 2.8104 | 2.3048 | 2.5 | 2.9449 | 1.9119 | 1.8149 | 1.8465 | | 1.6594 |
| 2.5344 | 2.7821 | 2.2511 | 2.43 | 2.9288 | 1.8686 | 1.7947 | 1.8146 | | 1.6013 |
| 2.4968 | 2.7538 | 2.1984 | 2.41 | 2.8699 | 1.8477 | 1.7208 | 1.7949 | | 1.569 |
| 2.4081 | 2.7187 | 2.1579 | 2.39 | 2.8049 | 1.7969 | 1.6804 | 1.7536 | | 1.5502 |
| 2.3522 | 2.6679 | 2.1375 | 2.37 | 2.7534 | 1.7526 | 1.6416 | 1.7242 | | |
| 2.3077 | 2.572 | 2.1172 | 2.34 | 2.7142 | 1.724 | 1.6073 | 1.6883 | | |
| 2.2518 | 2.5195 | 2.0864 | 2.25 | 2.6639 | 1.6929 | 1.5685 | 1.607 | | |
| 2.2008 | 2.4972 | 2.0326 | 2.2 | 2.5764 | 1.666 | | 1.5695 | | |
| 2.1583 | 2.4283 | 1.9874 | 2.18 | 2.5485 | 1.6483 | | | | |
| 2.1418 | 2.4053 | 1.9588 | 2.16 | 2.5169 | 1.6425 | | | | |
| 2.1192 | 2.3853 | 1.9337 | 2.14 | 2.4952 | 1.6075 | | | | |
| 2.0903 | 2.3679 | 1.9149 | 2.12 | 2.387 | 1.5701 | | | | |
| 2.0721 | 2.2964 | 1.8662 | 2.09 | 2.2965 | | | | | |
| 2.0345 | 2.2501 | 1.8507 | 2.08 | 2.2466 | | | | | |
| 1.9949 | 2.197 | 1.7921 | 2.03 | 2.2308 | | | | | |
| 1.9583 | 2.1714 | 1.7561 | 1.99 | 2.1947 | | | | | |
| 1.9361 | 2.1536 | 1.7257 | 1.93 | 2.1552 | | | | | |
| 1.9172 | 2.1384 | 1.6919 | 1.91 | 2.1331 | | | | | |
| 1.8869 | 2.0901 | 1.6513 | 1.85 | 2.1127 | | | | | |
| 1.869 | 2.0685 | 1.639 | 1.8 | 2.0838 | | | | | |
| 1.8512 | 2.0399 | 1.6093 | 1.76 | 2.0277 | | | | | |
| 1.8027 | 1.9799 | 1.5713 | 1.72 | 1.9923 | | | | | |
| 1.7562 | 1.9284 | | 1.68 | 1.9524 | | | | | |
| 1.7247 | 1.9112 | | 1.64 | 1.9116 | | | | | |
| 1.691 | 1.8853 | | 1.59 | 1.8824 | | | | | |
| 1.6796 | 1.8711 | | | 1.847 | | | | | |

TABLE 1-continued

Xray Diffraction data

| Example 1 | Example 2 | Example 3 | Example 5 | Example 7 | Example 9 | Example 21 | Example 18 | Example 17 | Example 19 |
|---|---|---|---|---|---|---|---|---|---|
| 1.6527 | 1.8472 | | | 1.7924 | | | | | |
| 1.6399 | 1.7955 | | | 1.7545 | | | | | |
| 1.6081 | 1.7529 | | | 1.7236 | | | | | |
| 1.5702 | 1.7196 | | | 1.6716 | | | | | |
| | 1.7027 | | | 1.6497 | | | | | |
| | 1.6804 | | | 1.6371 | | | | | |
| | 1.6578 | | | 1.6075 | | | | | |
| | 1.637 | | | 1.6012 | | | | | |
| | 1.5907 | | | 1.5617 | | | | | |
| | 1.5638 | | | | | | | | |

I claim:

1. A water-insoluble, dilute acid-soluble inorganic polyphosphate composition in solid form, the inorganic polyphosphate composition containing at least 15 wt. % calcium, magnesium or a combination thereof, 5 to 70 wt % orthophosphate, and optionally one or more micronutrients selected from the group consisting of boron, chromium, cobalt, copper, iodine, iron, manganese, molybdenum, selenium and zinc, with the proviso that the inorganic polyphosphate composition contains no more than 3.5 wt % of such micronutrients, combined, based on the total weight of the polyphosphate composition, the inorganic polyphosphate composition having a number average chain length of greater than 2 but less than 50 repeat units when the orthophosphate content of the inorganic polyphosphate composition is excluded from the average chain length calculation and a number average chain length of at least 1.1 but less than 50 repeat units when the orthophosphate content of the inorganic polyphosphate composition is included in the average chain length calculation, the repeat units comprising phosphate, sulfate, borate, molybdate, or selenate units, or a combination thereof, provided the ratio of phosphate units to the combined total of sulfate, borate, molybdate and selenate repeat units comprised by the inorganic polyphosphate composition is at least 2:1, the water-insoluble, dilute acid-soluble inorganic polyphosphate composition having
  (i) a solubility in room-temperature (25° C.) deionized water such that the combined amount of calcium, chromium, cobalt, copper, iodine, iron, magnesium, manganese, and zinc that dissolves from the inorganic polyphosphate composition during a 30 minute period in deionized water at room-temperature (25° C.) is less than 20% of the combined amount of calcium, chromium, cobalt, copper, iodine, iron, magnesium, manganese, and zinc that dissolves from the inorganic polyphosphate composition during a 30 minute period in 0.1 N HCl at room-temperature (25° C.), and
  (ii) a solubility in room-temperature (25° C.) dilute citric acid such that the combined amount of calcium, chromium, cobalt, copper, iodine, iron, magnesium, manganese, and zinc that dissolves from the inorganic polyphosphate composition during a 20 minute period in 0.2 wt. % citric acid at room-temperature (25° C.) is at least 75% of the combined amount of calcium, chromium, cobalt, copper, iodine, iron, magnesium, manganese, and zinc that dissolves from the inorganic polyphosphate composition during a 20 minute period in 0.1 N HCl at room-temperature (25° C.).

2. The water-insoluble, dilute acid-soluble inorganic polyphosphate composition of claim 1 wherein the inorganic polyphosphate composition contains 7.5 to 50 wt. % orthophosphate.

3. The water-insoluble, dilute acid-soluble inorganic polyphosphate composition of claim 1 wherein the inorganic polyphosphate composition contains 10 to 30 wt. % orthophosphate.

4. The water-insoluble, dilute acid-soluble inorganic polyphosphate composition of claim 1, wherein the inorganic polyphosphate composition has a number average chain length of 2.1 to 20 repeat units when the orthophosphate content of the inorganic polyphosphate composition is excluded from the average chain length calculation and a number average chain length of at least 1.2 to 20 repeat units when the orthophosphate content of the inorganic polyphosphate composition is included in the average chain length calculation.

5. The water-insoluble, dilute acid-soluble inorganic polyphosphate composition of claim 1, wherein the inorganic polyphosphate composition has a number average chain length of 2.5 to 7 repeat units when the orthophosphate content of the inorganic polyphosphate composition is excluded from the average chain length calculation and a number average chain length of at least 1.3 to 4 repeat units when the orthophosphate content of the inorganic polyphosphate composition is included in the average chain length calculation.

6. The water-insoluble, dilute acid-soluble inorganic polyphosphate composition of claim 1, wherein the repeat units of the inorganic polyphosphate composition comprise sulfate, borate, molybdate, or selenate units.

7. The water-insoluble, dilute acid-soluble inorganic polyphosphate composition of claim 1, the inorganic polyphosphate composition containing less than 2.5 wt. % of boron, chromium, cobalt, copper, iodine, iron, manganese, molybdenum, selenium and zinc, in combination.

8. The water-insoluble, dilute acid-soluble inorganic polyphosphate composition of claim 1, the inorganic polyphosphate composition containing at least 15 wt. % but not more than 35 wt. % of calcium and magnesium, in combination.

9. The water-insoluble, dilute acid-soluble inorganic polyphosphate composition of claim 1, the inorganic polyphosphate having a ratio, A:Z, having a value of 0.3:1 to 1.25:1 wherein A is the combined number of equivalents of calcium and magnesium incorporated in the inorganic polyphosphate composition and Z is the combined number of equivalents of phosphorous, boron, molybdenum, and selenium incorporated in the sulfate, borate, molybdate or selenate repeat units.

10. The water-insoluble, dilute acid-soluble inorganic polyphosphate composition of claim 1, the inorganic polyphosphate composition containing calcium, magnesium, or a combination thereof, and optionally one or more micronutrients selected from boron, chromium, cobalt, copper, iodine, iron, manganese, molybdenum, selenium, and zinc, the inorganic polyphosphate having a ratio, A:P, having a value of 0.3:1 to 1.25:1 wherein A is the combined number of equivalents of calcium and magnesium incorporated in the inorganic polyphosphate composition and P is the number of equivalents of phosphorous, P, incorporated in the inorganic polyphosphate composition.

11. The water-insoluble, dilute acid-soluble inorganic polyphosphate composition of claim 1, the inorganic polyphosphate composition containing calcium, magnesium, or a combination thereof, and optionally one or more micronutrients selected from boron, chromium, cobalt, copper, iodine, iron, manganese, molybdenum, selenium, and zinc, the inorganic polyphosphate having a ratio, A:P, having a value of 0.3:1 to 1:1 wherein A is the combined number of equivalents of calcium and magnesium incorporated in the inorganic polyphosphate composition and P is the number of equivalents of phosphorous, P, incorporated in the inorganic polyphosphate composition.

12. The water-insoluble, dilute acid-soluble inorganic polyphosphate composition of claim 1, having a solubility in
  (i) room-temperature (25° C.) dilute citric acid such that the combined amount of calcium, chromium, cobalt, copper, iodine, iron, magnesium, manganese, and zinc that dissolves from the inorganic polyphosphate composition during a 20 minute period in 0.1 wt. % citric acid at room-temperature (25° C.) is at least 75% of the combined amount of calcium, chromium, cobalt, copper, iodine, iron, magnesium, manganese, and zinc that dissolves from the inorganic polyphosphate composition during a 20 minute period in 0.1 N HCl at room-temperature (25° C.), or
  (ii) room-temperature (25° C.) dilute ethylenediaminetetraacetic acid (EDTA) such that the combined amount of calcium, chromium, cobalt, copper, iodine, iron, magnesium, manganese, and zinc that dissolves from the inorganic polyphosphate composition during a 20 minute period in 0.005 M EDTA at room-temperature (25° C.) is at least 75% of the combined amount of calcium, chromium, cobalt, copper, iodine, iron, magnesium, manganese, and zinc that dissolves from the inorganic polyphosphate composition during a 20 minute period in 0.1 N HCl at room-temperature (25° C.).

13. The water-insoluble, dilute acid-soluble inorganic polyphosphate composition in solid form as further described in claim 1, wherein the atomic ratio of calcium to magnesium is at least 0.2:1 (calcium:magnesium).

14. The water-insoluble, dilute acid-soluble inorganic polyphosphate composition in solid form as further described in claim 1, the polyphosphate composition containing at least 0.01 wt. % of one or more micronutrients selected from the group consisting of boron, chromium, cobalt, copper, iodine, iron, manganese, molybdenum, selenium and zinc, with the proviso that the inorganic polyphosphate composition contains no more than 3.5 wt % of such micronutrients, combined, based on the total weight of the polyphosphate.

15. The water-insoluble, dilute acid-soluble inorganic polyphosphate composition in solid form as further described in claim 1, the polyphosphate composition containing less than 10 wt. % water.

16. The water-insoluble, dilute acid-soluble inorganic polyphosphate composition in solid form as further described in claim 1, the polyphosphate composition being in the form of free-flowing granules having a particle size that is less than 80 mesh BS.

17. A fertilizer comprising a water-insoluble, dilute acid-soluble inorganic polyphosphate composition in solid form as further described in claim 1.

18. The water-insoluble, dilute acid-soluble inorganic polyphosphate composition of claim 1 wherein the composition contains no more than 1.5 wt. % of the micronutrients, in combination.

19. The water-insoluble, dilute acid-soluble inorganic polyphosphate composition of claim 1 wherein the composition contains no more than 0.5 wt % of the micronutrients, in combination.

20. The water-insoluble, dilute acid-soluble inorganic polyphosphate composition of claim 7, the inorganic polyphosphate composition containing at least 15 wt. % of calcium.

21. The water-insoluble, dilute acid-soluble inorganic polyphosphate composition in solid form as further described in claim 1, wherein the atomic ratio of calcium to magnesium is at 1.25:1 (calcium:magnesium).

22. The water-insoluble, dilute acid-soluble inorganic polyphosphate composition in solid form as further described in claim 1, wherein the atomic ratio of calcium to magnesium is at 2:1 (calcium:magnesium).

23. The water-insoluble, dilute acid-soluble inorganic polyphosphate composition in solid form as further described in claim 1, wherein the atomic ratio of calcium to magnesium is at 5:1 (calcium:magnesium).

* * * * *